(12) United States Patent
McBeth et al.

(10) Patent No.: US 12,309,460 B2
(45) Date of Patent: May 20, 2025

(54) SYSTEM AND PROCESS FOR COLLABORATIVE DIGITAL CONTENT GENERATION, PUBLICATION, DISTRIBUTION, AND DISCOVERY

(71) Applicant: Fireside Chat Inc., San Francisco, CA (US)

(72) Inventors: Falon McBeth, San Francisco, CA (US); Michael Ihbe, San Francisco, CA (US); Mark Cuban, San Francisco, CA (US)

(73) Assignee: Fireside Chat Inc., San Francisco, CA (US)

( * ) Notice: Subject to any disclaimer, the term of this patent is extended or adjusted under 35 U.S.C. 154(b) by 0 days.

(21) Appl. No.: 17/565,953

(22) Filed: Dec. 30, 2021

(65) Prior Publication Data

US 2022/0210514 A1 Jun. 30, 2022

Related U.S. Application Data

(60) Provisional application No. 63/132,087, filed on Dec. 30, 2020.

(51) Int. Cl.
*H04N 21/4788* (2011.01)
*H04N 21/2187* (2011.01)
(Continued)

(52) U.S. Cl.
CPC ..... *H04N 21/4788* (2013.01); *H04N 21/2187* (2013.01); *H04N 21/4532* (2013.01); *H04N 21/4667* (2013.01); *H04N 21/8173* (2013.01)

(58) Field of Classification Search
CPC ........... H04N 21/4788; H04N 21/2187; H04N 21/4532; H04N 21/4667; H04N 21/8173;
(Continued)

(56) References Cited

U.S. PATENT DOCUMENTS 10,726,489 B1 * 7/2020 Hamilton ............ G06F 16/3334
10,897,647 B1 * 1/2021 Hunter Crawley ..........................
H04N 21/8547

(Continued)

FOREIGN PATENT DOCUMENTS

WO WO-2019089028 A1 5/2019
WO WO-2019118469 A2 6/2019

OTHER PUBLICATIONS

International Search Report and Written Opinion for Application No. PCT/US2021/065648, dated Apr. 4, 2022.
(Continued)

*Primary Examiner* — Adil Ocak
(74) *Attorney, Agent, or Firm* — Vela Wood PC; Steven Wood

(57) ABSTRACT

A method and system for generating and adjusting collaborative content of communication sessions are disclosed. In some embodiments, the method includes receiving a first portion of data associated with an ongoing communication session created by a first user. The method includes detecting user interactions in the communication session, the user interactions including at least audio reactions or emoji reactions from one or more second users. The method then includes analyzing the user interactions to determine and provide feedback to the first user. The method further includes causing a second portion of the communication session to be adjusted by the first user based on the feedback while the communication session remains ongoing, wherein the second portion is subsequent to the first portion.

20 Claims, 19 Drawing Sheets

(51) Int. Cl.
*H04N 21/45* (2011.01)
*H04N 21/466* (2011.01)
*H04N 21/81* (2011.01)

(58) Field of Classification Search
CPC ........... H04N 21/44226; H04N 21/854; H04N 21/252
USPC .......................................................... 709/231
See application file for complete search history.

(56) References Cited

U.S. PATENT DOCUMENTS

| | | | |
|---|---|---|---|
| 11,115,228 B2* | 9/2021 | DeLanghe | H04L 12/1831 |
| 11,418,461 B1* | 8/2022 | Elfardy | G06N 3/006 |
| 2004/0194150 A1* | 9/2004 | Banker | G06F 16/958 |
| | | | 725/135 |
| 2012/0269360 A1* | 10/2012 | Burke | A47C 1/12 |
| | | | 381/77 |
| 2014/0195931 A1 | 7/2014 | Kwon et al. | |
| 2014/0244264 A1 | 8/2014 | Thirumalainambi et al. | |
| 2017/0206793 A1* | 7/2017 | Flaherty | G09B 5/00 |
| 2017/0345066 A1 | 11/2017 | Gupta et al. | |
| 2019/0065610 A1 | 2/2019 | Singh | |
| 2019/0118469 A1 | 4/2019 | Donovan et al. | |
| 2020/0184156 A1* | 6/2020 | Badr | G06F 40/35 |
| 2021/0297779 A1* | 9/2021 | Hawke | H04R 1/403 |
| 2021/0306173 A1* | 9/2021 | Krikunov | G06F 3/015 |

OTHER PUBLICATIONS

International Preliminary Report on Patentability for corresponding PCT Application No. PCT/US2021/065648, dated Jul. 4, 2023.

* cited by examiner

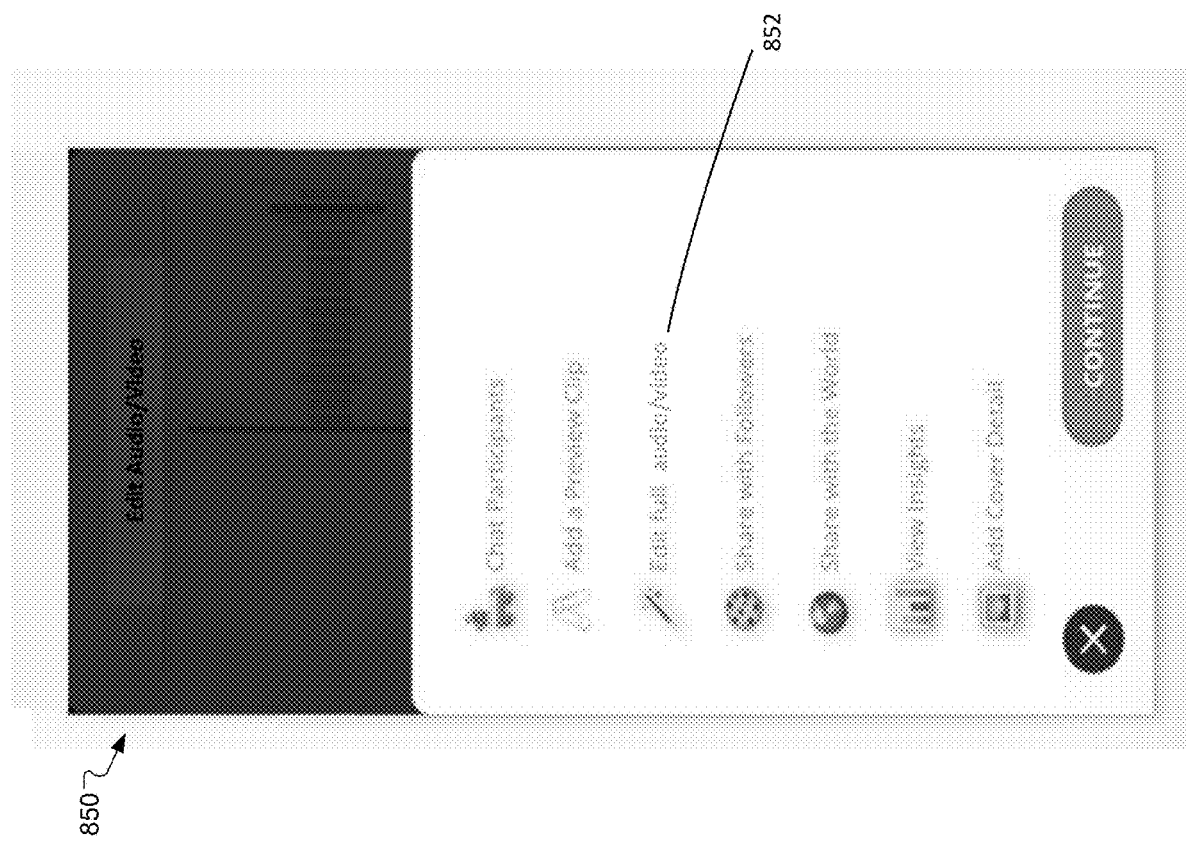

SYSTEM AND PROCESS FOR COLLABORATIVE DIGITAL CONTENT GENERATION, PUBLICATION, DISTRIBUTION, AND DISCOVERY

CROSS REFERENCE TO RELATED APPLICATION

This application claims the benefit of U.S. Provisional Patent Application No. 63/132,087, filed Dec. 30, 2020, the entire contents of which are incorporated by reference herein.

TECHNICAL FIELD

This disclosure relates to a method and system for generating and adjusting collaborative content of a communication session based on real-time analysis and predictions.

BACKGROUND

A variety of content management systems (e.g., streaming applications, podcasting services) have been developed in recent years, in which content providers or creators can design and provide content for delivery to users or audience using computer networks. The existing content management systems, however, face many challenges. First, these systems provide little or no support for a creator to efficiently create new content. The creator usually takes a lot of effort to produce the content. When the content (e.g., a new episode of a show) is produced, the current systems lack tools or analytics to help the creator to record or edit the content. Also, content discovery is challenging. For example, when new content is created from a conversation, discovering the new content may require an audience to listen to or watch the whole long-form conversation. Moreover, in the existing content management systems, content providing process is a one-way communication process. A creator basically has no ability to collaboratively create content with his/her audience. In other words, the current systems do not have an effective way to assess the quality of the content before the content is distributed to the audience. The existing systems cannot provide insights about the audience (e.g., audience preferences, audience reactions) to the creator, and so, the creator can only guess the content he/she should continue to create. It is therefore difficult for the creator to create content that is attractive to the audience.

SUMMARY

To address the aforementioned shortcomings, a method and a system for generating and adjusting collaborative content of communication sessions based on real-time analysis and predictions are provided. The method receives a first portion of data associated with an ongoing communication session created by a first user. The method detects user interactions in the communication session, the user interactions including at least audio reactions or emoji reactions from one or more second users. The method then analyzes the user interactions to determine and provide feedback to the first user. The method further causes a second portion of the communication session to be adjusted by the first user based on the feedback while the communication session remains ongoing, wherein the second portion is subsequent to the first portion.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 8B illustrates an example user interface for using editing tools to edit a communication session, according to some embodiments.

DETAILED DESCRIPTION

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The present disclosure provides an audio and visual social communication platform that empowers creators to create, broadcast, record, distribute, and monetize online communications to promote effective and interesting discourse. In particular, the present platform described herein allows a creator to create productive and real-time conversations and generate interactive and collaborative content. The online communication session or the conversation may be a virtual meeting, an online chat, a live show, etc. The content may be text, audio, video, or combinations thereof. The communication session may further be published, distributed, discovered, and monetized. The present platform is a broadcasting platform including a virtual studio with a social system (e.g., YouTube®, Instagram Live®, Twitch®, Twitter®, etc.) built-in. In some embodiments, the communication session may be streamed live in the present platform or broadcasted live, e.g., by simulcast to other social networks. In other embodiments, the communication session may be recorded, saved, and edited for later distribution to the audience, e.g., other social platforms, podcast destinations, or for viewing on-demand in the present platform.

Figure 1:
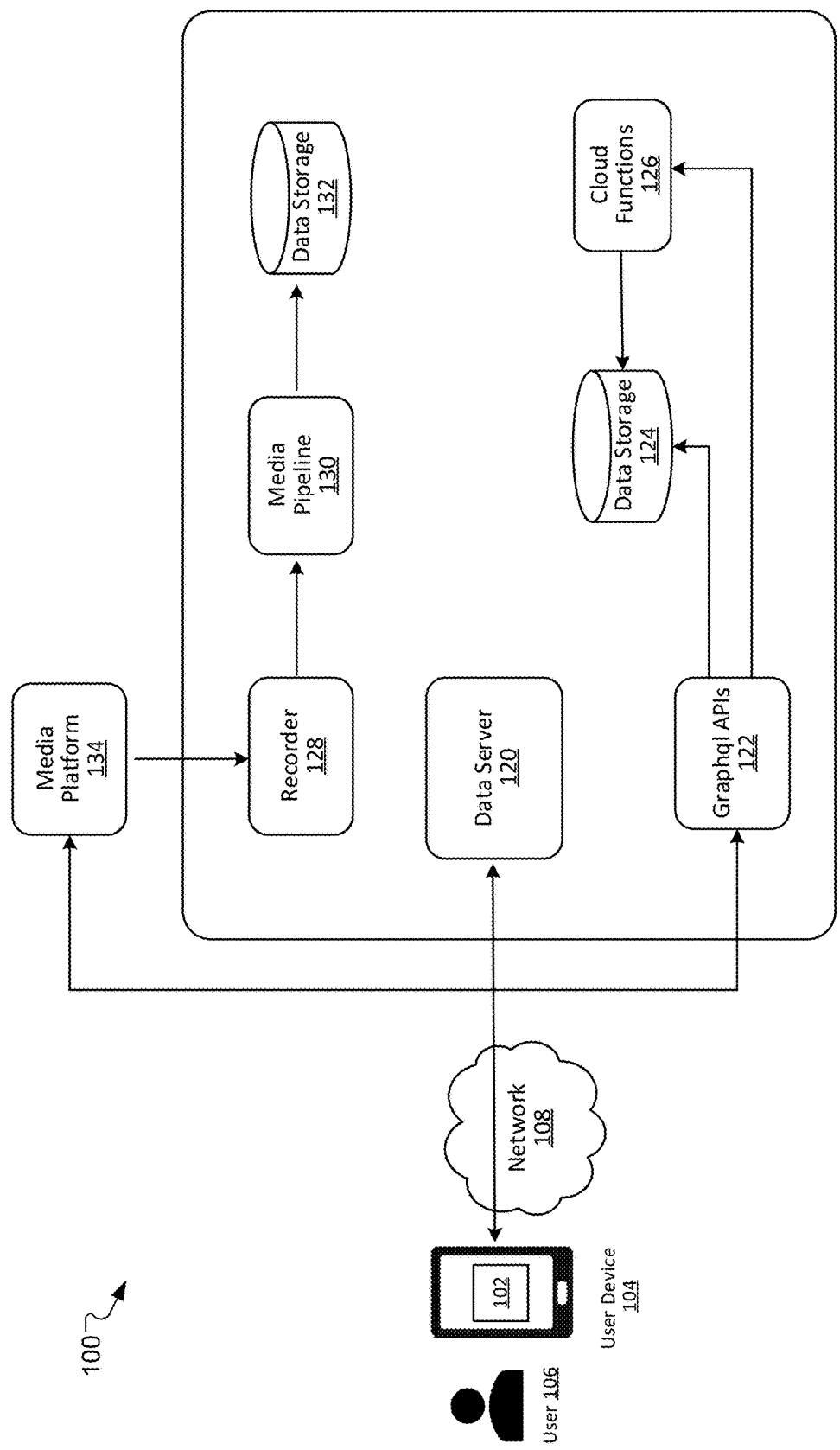
FIG. 1 illustrates a block diagram of system architecture for managing collaborative content, according to some embodiments.

FIG. 1 illustrates a block diagram of system/platform architecture 100 for managing collaborative content, according to some embodiments. Managing the collaborative content may include one or more of generating, publishing, distributing, discovering, or monetizing the content. A user device 104 may be accessed by user 106 to perform content management-related tasks via the software application 102. By way of example and not limitation, user device 104 can be a smartphone device, a tablet, a tablet personal computer (PC), or a laptop PC. In some embodiments, user device 104 can be any suitable electronic device connected to a network 108 via a wired or wireless connection and capable of running software applications like software application 102. In some embodiments, user device 104 can be a desktop PC running software application 102. In some embodiments, software application 102 can be installed on user device 104 or be a web-based application running on user device 104. By way of example and not limitation, user 106 can be a creator who generates, publishes, and distributes the content, an audience who collaborates with the creator to generate the content, or a user/audience who searches for the content. The user can communicate with data server 120 and other entities in platform 100 via software application 102 residing on user device 104.

Network 108 can be an intranet network, an extranet network, a public network, or combinations thereof used by software application 102 to exchange information with one or more remote or local servers such as data server 120. According to some embodiments, software application 102 can be configured to exchange information, via network 108, with additional servers/entities that belong to system 100 or other systems similar to system 100 not shown in FIG. 1.

In some embodiments, platform 100 provides a set of services oriented at flexible data access and fast iteration. This includes a set of graphql application program interfaces (APIs) 122 that accesses data storage 124 directly or via cloud functions 126. In some embodiments, graphql APIs 122 may be powered by Hasura® and backed by a Postgres® database 124 with lambda functions 126 for handling business logic. Platform 100 also provides a robust and extensible media processing pipeline 130 that processes recording and transcoding of a communication session/conversation received from recorder 128 and stores the processed data in data storage 132. A media platform 134 distributes media data (e.g., audio) to recorder 128 for recording the content. In some embodiments, media processing pipeline 130 may be a GStreamer® framework, recorder 128 and data storage 132 may be Google® infrastructure, and media platform 134 may be Agora® platform.

In some embodiments, one or more third-party servers perform the corresponding functionalities of components 122-134. Data server 120 communicates with user device 104 via software application 102 and cooperates with the third-party servers using APIs over a network (e.g., network 108) to implement the functionalities described herein.

Overall Content Management Process

Figure 2:
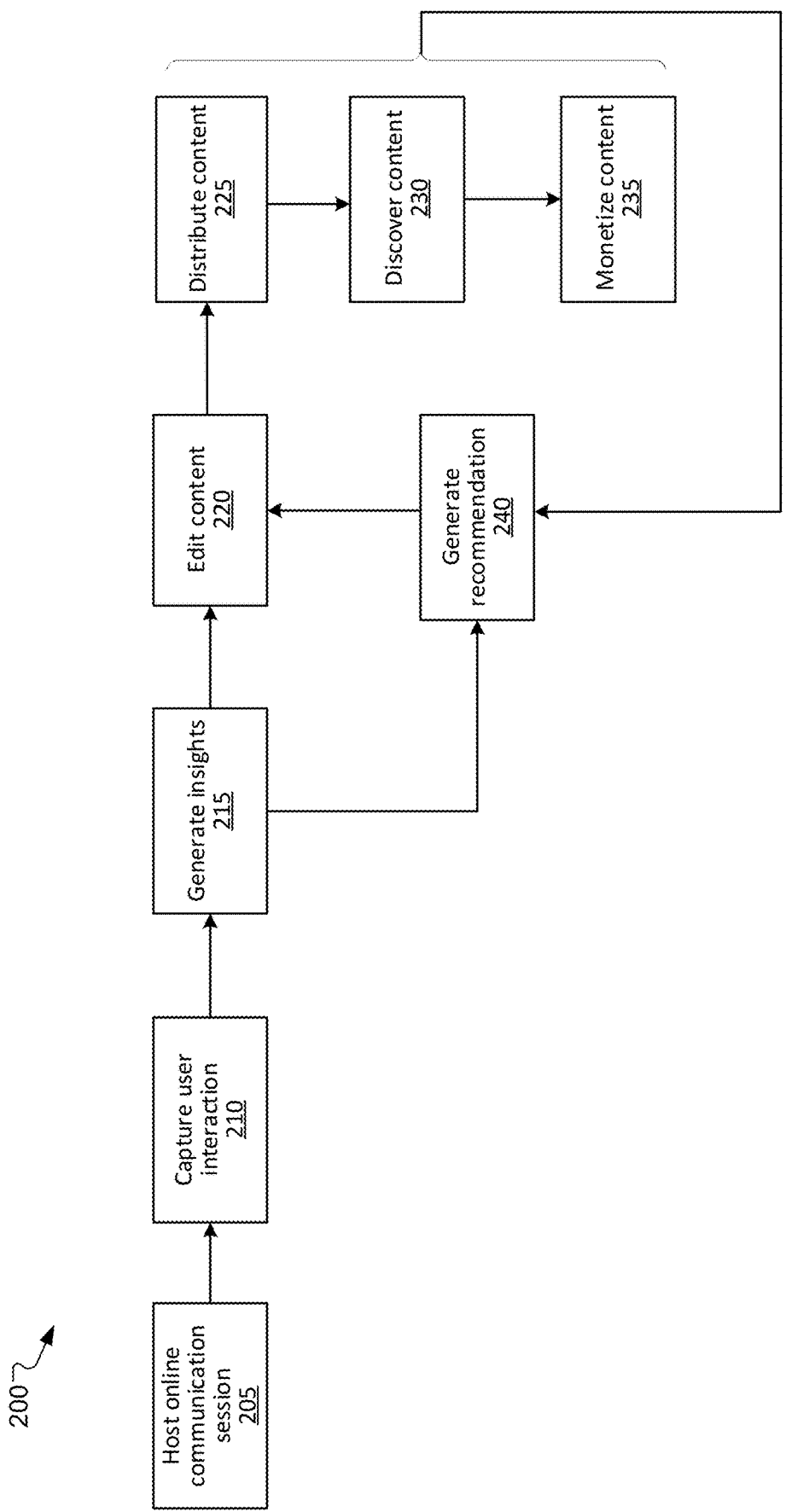
FIG. 2 illustrates an exemplary high-level process for managing collaborative content, according to some embodiments.

The present disclosure allows for collaborative content creation between audience(s) and creator(s), that is, generating quality content and providing the content via various social platforms based on analyzing and understanding audience reactions to the content. FIG. 2 illustrates an exemplary high-level process 200 for managing (e.g., generating, distributing, etc.) collaborative content. In some embodiments, process 200 may be implemented by data server 120 in communication with user device 104 and other entities (e.g., components 122-134) in system 100 of FIG. 1. It should be noted process 200 as shown in FIG. 2 merely includes exemplary operations that can be added, removed, or modified.

In the illustrated embodiment, process 200 starts with operation 205 to host an online communication session. The communication session or conversation may be a live show, a webinar, an industry forum, an online chat through social networking service, a training session, or any other type of virtual meetings. In some embodiments, hosting an online communication session includes allowing a creator to create the communication session and a user to join the communication session. A creator may create a communication session about a topic via a software application (e.g., a mobile application, web application) of a user device (e.g., a mobile device). A user may join the communication session (e.g., based on viewing a preview of the communication session). The user participating in the communication session is an audience. The creator may invite one or more audience or other creators to participate in the communication session.

At operation 210, user interactions in the communication session are captured. The other creator(s) invited by the creator may co-host the communication session with the creator, play as a panelist in the communication session, or participate in a 1:1 interview of the communication session. An audience may ask questions to speakers and react with emojis and/or messages in the communication session. In some embodiments, the audience may be added to a virtual stage of the communication session (e.g., a show) and his/her reactions can be a part of the show. The audience's reactions include at least the sound effects and emoji reactions. An emoji can be an Animoji, which is an animated reacting emoji. The sound effects may be triggered by emoji reactions.

The present disclosure allows a communication session to be recorded in real time, where the real-time participation of the audience and other creators in the session is also recorded. The present disclosure also allows the audience, speakers, creators, and panelists to broadcast the communication session to a third-party platform. For example, a show may be recorded live as well as being available on-demand and streamed to others at a later time. In some embodiments, the present disclosure supports an artifact sharing system that facilitates the creator, speakers, and/or audience to leverage rich media or widgets within a communication session (e.g., a virtual auditorium) to record, edit, and share the content of the communication session. For example, the artifact sharing system may provide a picture-in-audio/video for displaying on a user device associated with an audience. The artifact sharing system may also allow the audience or other users to screen share and stream the content of the communication session on the Internet within a user interface or share a static link without leaving the present platform. The artifact sharing system will be described below with reference to FIGS. 5A-5C.

Once the communication session ends, at operation 215, various types of insights related to the communication session are generated. For example, the creators and speakers may receive content insights. The content insights may include user feedback on which portion(s) of the recorded communication session people were most engaged, least engaged, had the highest positive sentiment, etc. There are many other types of insights (e.g., replay insights), which will be described below with reference to FIGS. 7A-7C. These insights provide creators and speakers the feedback on how to improve the content generation, e.g., avoiding topics, segments, and the audience that are not engaging and creating quality content on the fly or in the next communication session. These insights also help a creator to generate a preview clip of the communication session that easily attracts the audience.

At operation 220, the present disclosure allows the creator to edit the content (e.g., text, video, and audio) of the communication session using one or more filters and editing tools. The present disclosure allows the creator to generate a collaborative piece of content with his/her audience on the present platform based on, for example, determining any audio and video content format the creator wants to use, determining the way the creator wants the audience to be involved in the creation of the content, etc. The way the audience can be involved in content generation includes whether to allow questions and answers (Q&A) in a talk show, whether to allow monologue in a theatrical podcast, etc.

After the content of the communication session is edited, at operation 225, it may be distributed. Alternatively or additionally, the content may be distributed without any editing. In some embodiments, the content may be distributed across multiple platforms including the present platform described herein and other third-party platforms, for example, through a public profile of the creator and/or participant(s) associated with the present platform. For example, the content may be broadcast live on the present platform as well as on other third-party platforms such as YouTube® live at the same time. In some embodiments, using the artifact sharing system, the present disclosure allows the content of the communication session to be transcribed and a customized video to be generated and distributed.

Upon the distribution of the content, at operation 230, the content may be searched and discovered by users. In some embodiments, the present disclosure facilitates the discovery of recorded content to all users via a featured section in a main communication session feed. In addition, the present disclosure allows monetization of the content at operation 235, for example, via virtual goods, subscriptions, event tickets, brand sponsorships, tips, etc.

In some embodiments, user feedback regarding the content distribution, discovery, or monetization is collected and fed into one or more machine learning (ML) models to generate one or more recommendations at operation 240. The one or more machine learning models may also use the insights generated at operation 215 as input to train the one or more ML models to generate the recommendations. In some embodiments, as depicted, a recommendation may be provided for a creator to edit the content prior to the content being distributed. In other embodiments, a recommendation may be provided for improving the subsequent content generation, e.g., recommending domain experts, instructing creators to create communication sessions on certain hot topics, etc.

The present disclosure may record and analyze every interaction/conversation for every user (e.g., speakers, audience). In some embodiments, the user interactions are analyzed to identify users' domain expertise across a particular set of topic areas. For example, the present disclosure may analyze discussions around a topic, audience reactions, sentiments, user feedback, community standings on one or more platforms, shared artifacts and metadata associated with the artifacts, inferences from social connections, etc. Therefore, when a user creates the content around a particular topic area, the present disclosure may recommend verified domain experts to bring into that discussion. The present disclosure may further store and analyze user content creation and interactions to generate predictions or recommendations at scale.

To generate the recommendations, the present disclosure may combine one or more of a social graph, interest graph, and expertise graph to perform clustering on different dimensions. For example, the present disclosure may create a representation of proximity (e.g., strength of a relationship) between topics, users (e.g., creators), and content formats, and thus power the recommendation generation in a personalized manner to individual users. With the combination of editorial and machine learning approaches, not only the high-quality content can be surfaced to a user, but also the content can continue to be trained/learned and improved over time.

Generally, the present disclosure supports both synchronous (e.g., drop-in, livestreaming) and asynchronous (e.g., podcasting) content generation and publication, allowing creators to store and distribute their recordings via audio, video, and text (e.g., transcription). The present disclosure provides the creators with the controls necessary to generate desired content, enables the creators to distribute and monetize the generated content effectively, and obtains valuable feedback and insights to continue to create better content that drives the retention, engagement, and revenue growth.

The present disclosure provides an end-to-end platform to empower creators to create, broadcast, record, distribute, and monetize online communications to promote effective and interesting discourse. Instead of the one-way content generation without audience collaboration in existing content providing systems, the techniques described herein detect, analyze, and understand how audience are reacting to communication sessions, and, therefore, generates quality content that are most attractive to audience. Since the audience reaction analysis is implemented in real time when the audience are consuming the live communication session, the techniques described herein can improve the content quality on the fly. In addition, the techniques described herein use a combination of editorial and machine learning approaches, which not only surfaces high-quality content users but also continues to train and learn the content, thereby improving the content generation over time. For example, predictions and recommendations for talent, content, distribution, and marketing may be generated over time to create quality content. These predictions and recommendations will be described in detail with reference to FIG. 3. Further, based on understanding and learning from the audience reaction data, the techniques described herein can make hit prediction analytics to obtain the likelihood that the created content becomes a hit. This is of particular importance. The techniques described herein allow the creators to understand how the audience are reacting to the content as the audience consume the piece of content in real-time. The techniques described herein further allow the creators to obtain the hit prediction and recognize and understand that they can modify the content of the communication session on the fly to engineer, or even create, the hits. In other words, the techniques described herein automatically instruct the creators to create the successful content. In contrast, the existing content generation system at most manually capture the hit information through focus groups and assist in the content generation. Moreover, the techniques described herein provide analytics for creators and speakers to better understand what content to continue creating or to avoid over time, thereby increasing audience engagement in the long run.

In addition to the intelligent content creation, the techniques described herein also support efficient and effective content publication, distribution, monetization. For example, the techniques described herein allow the content to be distributed to multiple platforms live and on-demand. In many cases, the distribution operation is as simple as just one tap. The techniques described herein allow the content to be viewed without leaving the present platform, for example, viewing an article while listening to the communication session at the same time in the one platform, thereby the operational overhead (e.g., additional network and computer resource usage, extra processing time, etc.) are reduced. Furthermore, the techniques described herein accommodate a feedback/insight loop mechanism that improves the accuracy, reliability, and flexibility of the system over time.

The techniques described herein are typically implemented based on the communications between servers and mobile devices. The techniques improve the usefulness of the mobile communication facility. For example, if a communication session itself is not appropriate for presentation to a particular mobile device (e.g., with low communication facility such as bandwidth) due to its capacity limitation on display and/or computer characteristics, this communication session may be replaced by a highlighted, concise version that is appropriate for presentation to the mobile communication facility. In addition, before a user decides to join a communication session, the techniques described herein allow the user to listen to a short clip of a live communication session at a given moment instead of the whole long-form session, which not only guarantees the user to get the most accurate information, i.e., the real conversation at that moment, but also increases the mobile communication facility by eliminating unnecessary waste on computer resource usage and processing time/power.

In some embodiments, the present platform-oriented approach is based on APIs and software developer kits (SDKs). For example, a third-party website may include widgets and/or links on its own website to start a communication session. The third-party website may tailor the communication session that it drives to the platform through the SDK tools. As a result, the content of a communication may be published across platforms. A communication session experience may be embedded in any website, and also rich media may be embedded in the communication session. Further, authentication information associated with users may be passed to various applications from the communication session. In some embodiments, the third-party website may communicate with data server 120 to generate and manage the content of a communication session, where the functionalities of data server 120 will be described in detail in FIGS. 3-12.

Content Management

Figure 3:
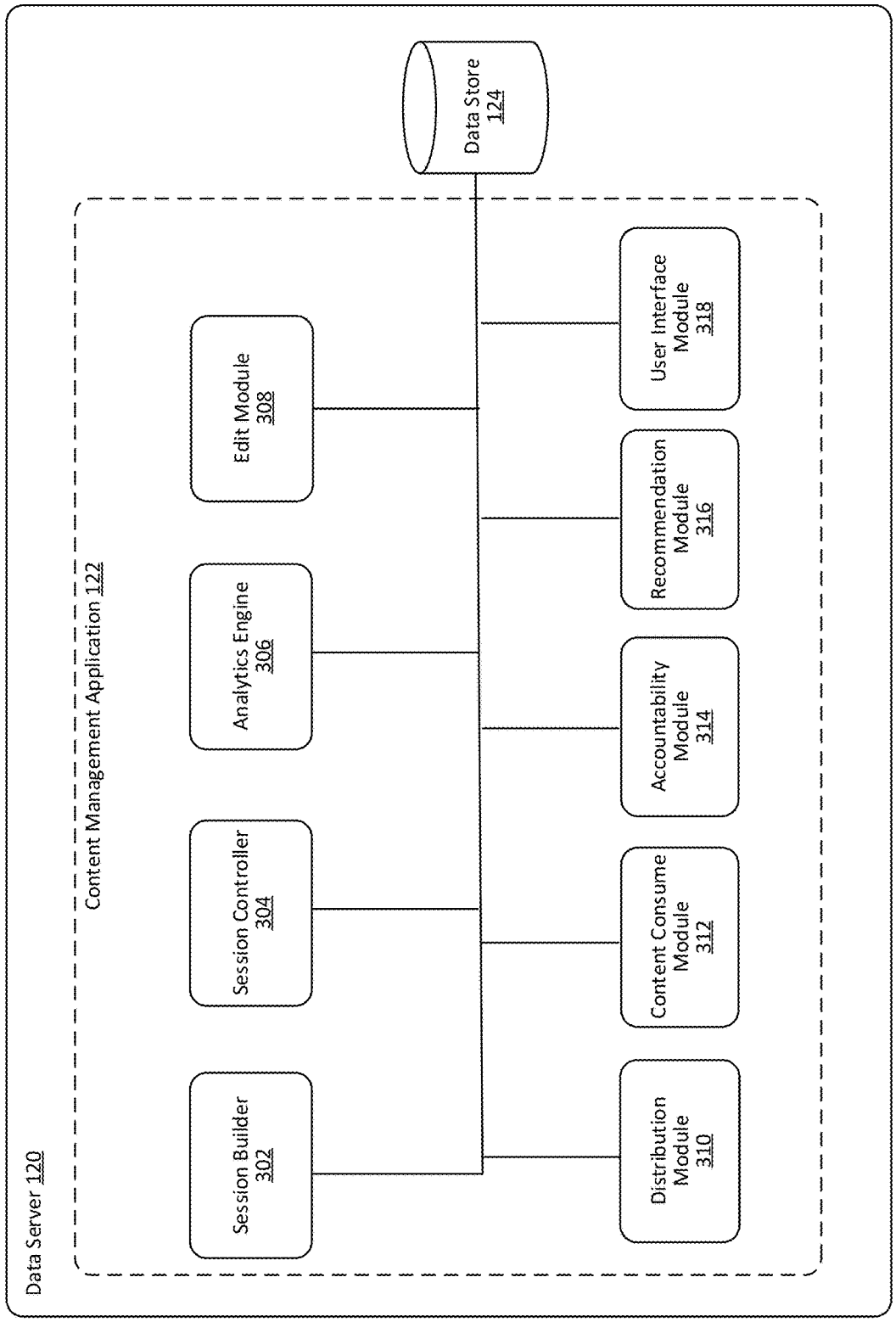
FIG. 3 is a server used as part of a system for managing collaborative content using the methods described herein, according to some embodiments.

In some embodiments, FIG. 3 depicts selective components of data server 120 used to perform the functionalities described herein, for example, operations of process 200. Data server 120 may include additional components not shown in FIG. 3. These additional components are omitted merely for simplicity. These additional components may include, but are not limited to, computer processing units (CPUs), graphical processing units (GPUs), memory banks, graphic adaptors, external ports and connections, peripherals, power supplies, etc., required for the operation of data server 120. The aforementioned additional components, and other components, required for the operation of data server 120 are within the spirit and the scope of this disclosure.

In the illustrated embodiment of FIG. 3, data server 120 includes a content management application 122 and a data store 124. In some embodiments, server-side content management application 122 may communicate with user 106 via software application 102 residing on the user device 104 to perform the functionalities described herein. Each user may have a public profile. When a user registers to software application 102, the user may also have an in-application profile. The profiles are used to present data received from the communications between software application 102 and server-side content management application 122. In some embodiments, content management application 122 includes one or more modules responsible for processing and analyzing the information received by data server 120. For example, the modules in content management application 122 may access a communication session, detect and analyze the user reactions in the session, and generate and distribute content of the communication session that is most interesting to users.

In some embodiments, each module of content management application 122 may store the data used and generated in performing the functionalities described herein in data store 124. Data store 124 may be categorized in different libraries (not shown). Each library stores one or more types of data used in implementing the methods described herein. By way of example and not limitation, each library can be a hard disk drive (HDD), a solid-state drive (SSD), a memory bank, or another suitable storage medium to which other components of data server 120 have read and write access. In some embodiments, data store 124 may be communicatively connected with data storage 124 or data storage 132 for data storing and retrieving.

In some embodiments, content management application 122 of data server 120 includes a session builder 302, a session controller 304, an analytics engine 306, an edit module 308, a distribution module 310, a content consumer module 312, an accountability module 314, a recommendation module 316, and a user interface module 318. In some embodiments, content management application 122 of data server 120 may include only a subset of the aforementioned modules or include at least one of the aforementioned modules. Additional modules may be present on other servers communicatively coupled to data server 120. For example, session builder 302 and session controller 304 may be deployed on separate servers (including data server 120) that are communicatively coupled to each other. All possible permutations and combinations, including the ones described above, are within the spirit and the scope of this disclosure.

Building Communication Session

Session builder 302 communicates with one or more user devices 104 to host an online communication session and to process the data exchanged with the one or more user devices 104. In some embodiments, session builder 302 provides graphical user interfaces (GUIs) and tools for users to create and interact in the communication session. For example, session builder 302 may allow a creator to create the communication session and invite a user to join the communication session.

Figure 4B:
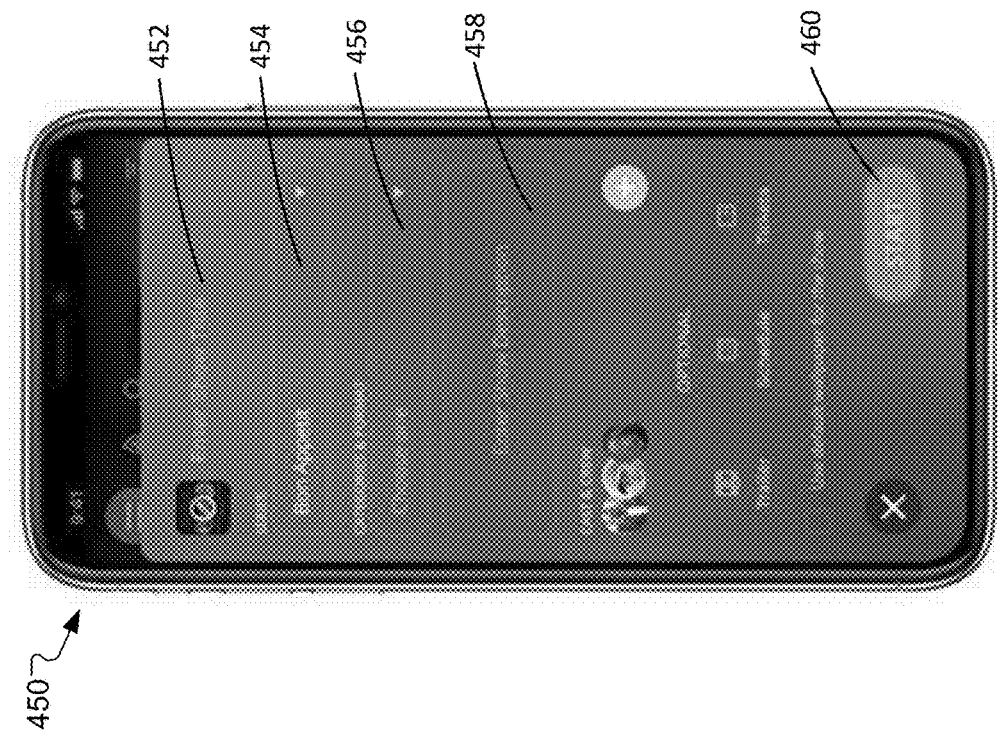
FIG. 4B illustrates an example user interface for creating a new communication session, according to some embodiments.
Figure 4A:
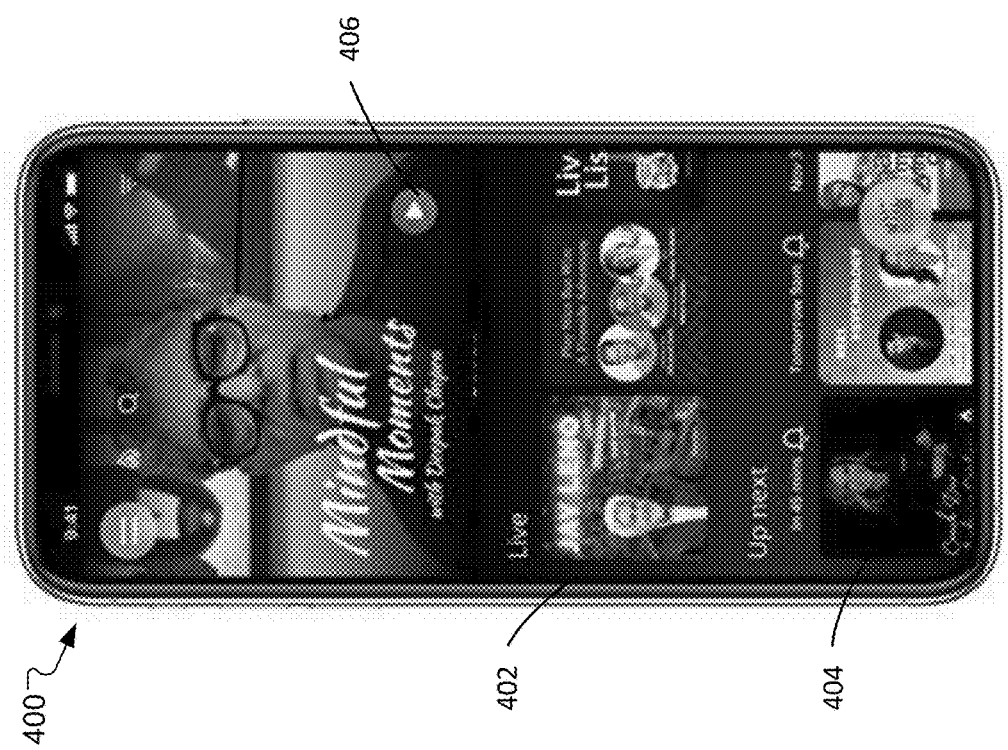
FIG. 4A illustrates an example user interface for a user joining and interacting in a communication session, according to some embodiments.

FIG. 4A is an example graphical user interface (GUI) 400 for a user joining and interacting in a communication session, according to some embodiments. GUI 400 represents a main feed that displays live communication sessions (e.g., 402) and upcoming communication sessions (e.g., 404). Session builder 302 allows a user wanting to join a communication session to click a play button 406 and hear a snippet. The snippet, e.g., a preview, a highlight, etc., may indicate the content that is playing live at that given moment. In some embodiments, a video or audio trailer may also be used to promote the communication session/show generated in the present platform. The snippet as well as the video/audio trailer is used by users to preview the content of the communication session to determine whether to participate in the communication session, consume a piece of content of the communication session, or add to a calendar for an upcoming communication session. In some embodiments, the creator may generate a preview clip/snippet before the live communication session begins. In other embodiments, session builder 302, in communication with other modules of content management application 122, may automatically transcribe the communication session in real time such that the creator can generate, during the live communication session, a snippet that accurately reflects the content of the communication session. In yet other embodiments, the creator may generate a new snippet after the communication session starts and prior to the recording of the communication session being distributed. For example, session builder 302 along with other modules may allow the new snippet to be generated based on leveraging various types of insights derived from the communication session.

FIG. 4B is an example user interface 450 for creating a new communication session, according to some embodiments. In GUI 450, session builder 302 allows a creator (e.g., user 106) to create the communication session by using a software application 120 (e.g., web application, mobile application) residing on user device 104 (e.g., mobile device). Session builder 302 allows the creator to enter the title of a communication session (e.g., a show) in 452, select the series for the show in 454, identify categories (e.g., libations, sports) and formats (e.g., audio, video) in 456 for the communication session, and provide a description for the communication session in 458. An example list of categories and formats are shown below:

"Live Learning" communication sessions/shows on cooking, business & finance, health & fitness, art & music, tutorials, makeovers, etc.

"Collab" communication sessions/shows such as advice shows, crowd sourced shows, problem solving shows, roundtable shows, panel shows, talk shows, happy hours, etc.

"Investigation" communication sessions/shows such as true crime shows, fact finding shows, scientific exploration shows, etc.

"Exclusive & First Looks" communication sessions/shows on book launches, album releases, premiere events, all access passes, behind the scenes, etc.

"Live Performance & Events" shows such as comedy, theater, concerts, etc.

"Watch Along" communication sessions/shows on big events, newsworthy events, sports, movies & shows, games, etc.

"Play Along" communication sessions/shows such as game shows, trivia shows, party games, gaming (table & video games), giveaways, unboxing, betting, live shopping, etc.

"Companion Content" such as deep dives, spin offs, after-shows, pre-shows, etc.

"Interview" communication sessions/shows about public figures/celebrities, athletes, experts, content creators, etc.

"Community Gathering" communication sessions/shows with support groups or other groups.

Experimental communication sessions/shows.

In some embodiments, the category feature may enable a filtering mechanism for a user to search and discover the content according to a topic of interest. The user may be the creator, a speaker, an audience, or any other user. Session builder 302 may also allow the user to upload custom wallpaper(s), choose an option to monetize the communication session, etc. When the creation of the communication session is complete, the creator selects start button 460 to move to the next stage of the communication session.

Conducting Communication Session

Session controller 304 communicates with other modules of content management application 122 to control and monitor the progress of a communication session and collect the data of interactions generated in the communication session. In some embodiments, session controller 304 in combination with user interface module 318 generates and provides an auditorium for users to interact with each other in the communication session, where user interface module 318 may generate graphic data for displaying graphical representations on user device 104 associated with user 106 as described herein in this disclosure.

Figure 5B:
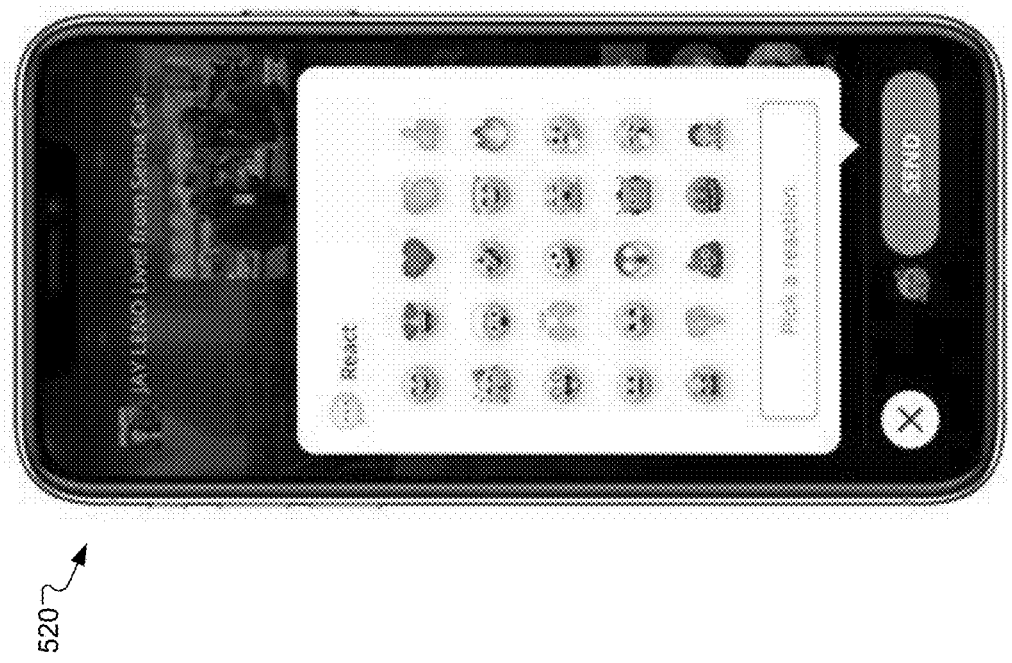
FIG. 5B illustrates an example user interface for providing user sentiment, according to some embodiments.
Figure 5A:
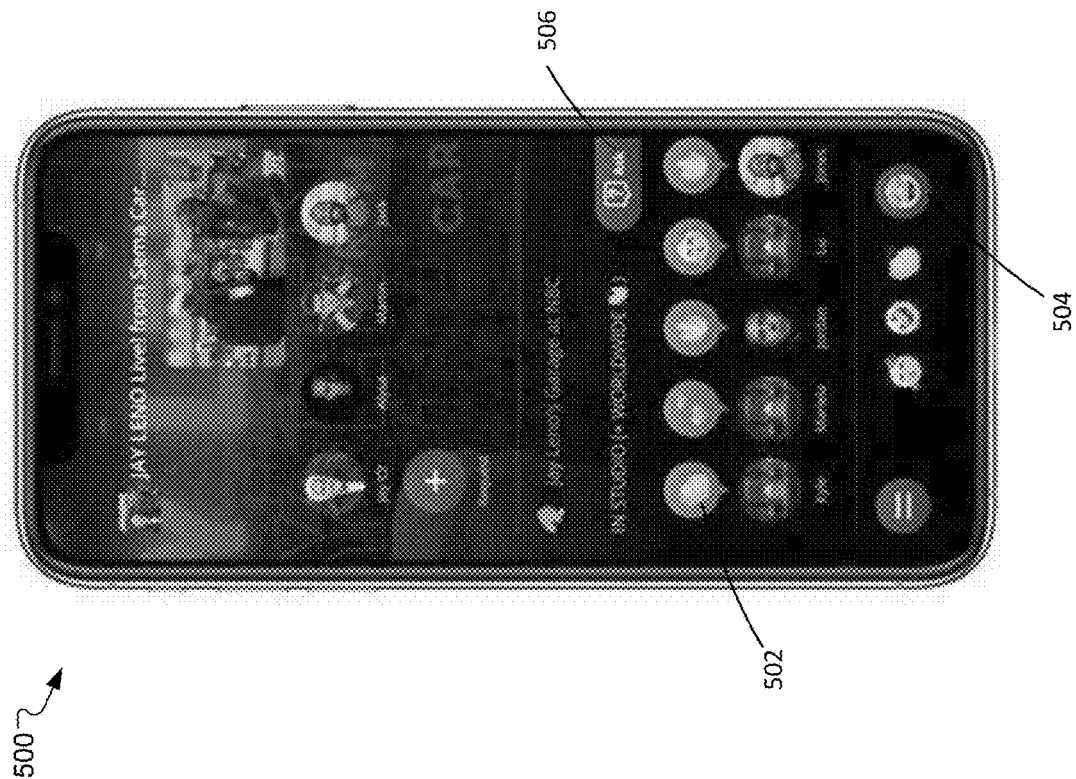
FIG. 5A illustrates an example user interface of a communication session auditorium, according to some embodiments.

An example auditorium 500 is shown in FIG. 5A. This auditorium shows that a number of people (e.g., four) are speaking on a virtual stage of the communication session (e.g., the show of "Jay Leno's Garage" at NBC). Session controller 304 also includes emojis 502 in auditorium 500. These emojis or Animojis indicate the sentiment of the audience (e.g., listeners or viewers) toward the content being broadcast at that moment in time. For example, an audience may use icons 504 to select an emoji to represent his/her feelings at a particular moment. In some embodiments, in reaction to consuming a clip or a replay of the communication session after the live communication session is recorded, the emoji/Animoji reactions from the audience may also occur. Therefore, the emoji/Animoji reactions happen both live and on demand. These reactions can be used as feeds to generate various insights. Session controller 304 further includes an ask option 506 in auditorium 500 for a speaker to ask questions or send information (e.g., a web link, a text-based message) to the audience. FIG. 5B illustrates an example user interface 520 for providing user sentiment, according to some embodiments. An audience member may select an emoji or an Animoji to communicate his/her sentiment regarding the communication session at a particular point in time.

In some embodiments, session controller 304 may customize an auditorium based on the content type or format of the communication session. Depending on different content formats, session controller 304 may include different widgets (e.g., a "talk show" widget, a "panel" widget, a "sports commentating" widget, etc.), different background images, different artifacts, different injected audio, etc., in a customized auditorium. For example, session controller 304 may create a gaming widget in the auditorium (e.g., using an API) such that users can watch or play a poker game visually while communicating with others in audio. In another example, for a communication session related to sports, session controller 304 may add a score widget to the auditorium.

Figure 5C:
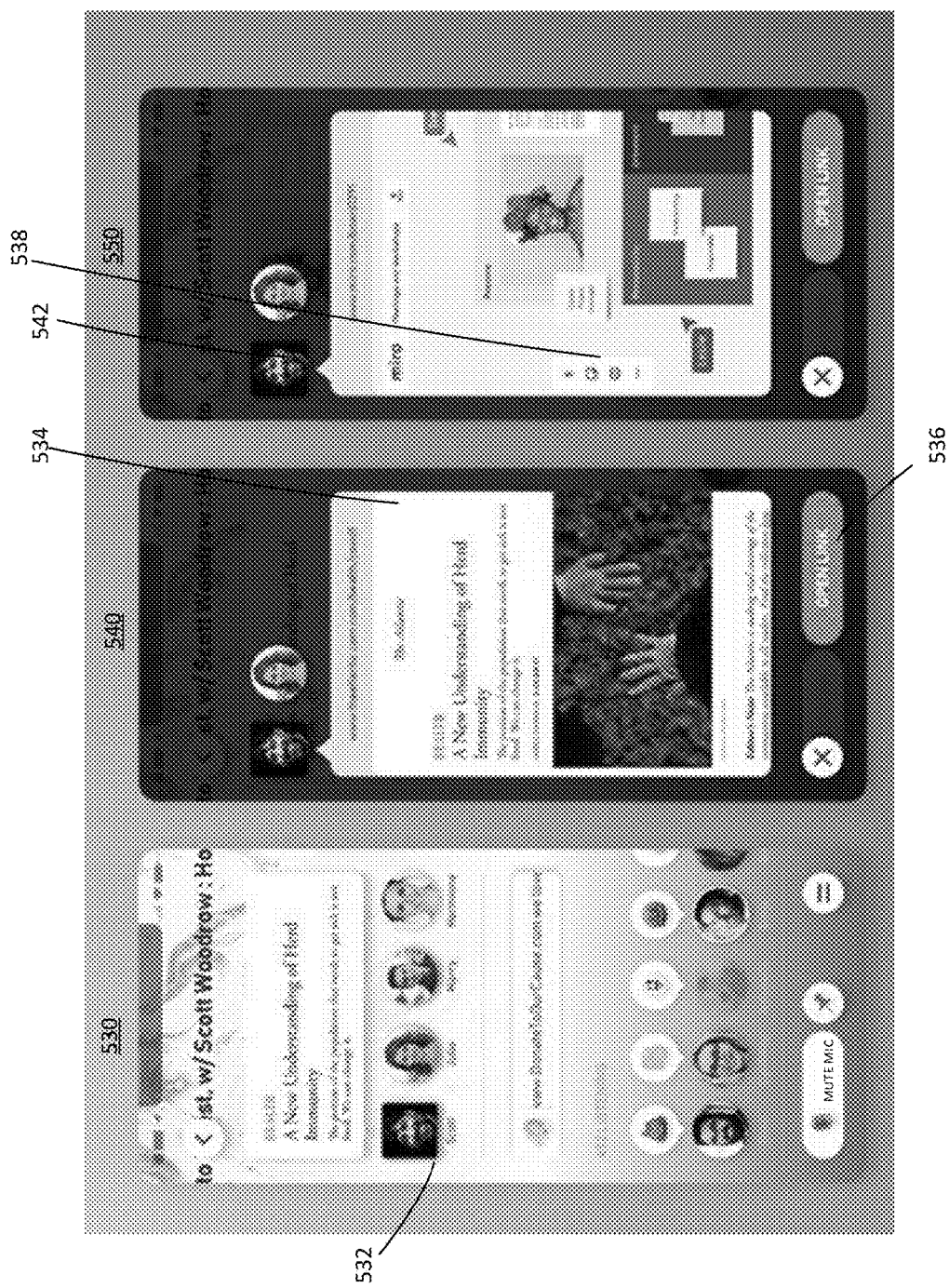
FIG. 5C illustrates example user interfaces for a user viewing content within a communication session using an artifact sharing system, according to some embodiments.

An artifact sharing system is a system where users can share any type of content within the context of an audio/video stream. The content may be a video, a link, an embeddable interactive experience such as a website, a video game, a screen sharing, etc. In some embodiments, session controller 304 may use the artifact sharing system to enable users to view the content without leaving the present platform in which the communication session is being held. FIG. 5C includes GUIs 530, 540 and 550, where GUI 530 represents a main communication session feed. In this feed, audience may ask questions to the people on stage and request to speak. As shown in FIG. 5C, when a speaker Scott mentioned an article in 532 of the main feed of a communication session, this article may be viewed by users in 534 within the communication session. Alternatively or additionally, this article may also be viewed outside the communication session when a user selects an "open link" option 536.

In some embodiments, session controller 304 also allows a host (e.g., creator) to designate one or more producers. A producer may moderate or adjust the communication session (e.g., a show) by controlling the people on stage. For example, the producer may add or remove speakers to or from a virtual stage of the show, or move an audience member onto the virtual stage. Often, both creators and producers are able to move people out of the communication session and bring audience members on stage. This moderation feature is advanced in assisting the creator's desired experience for his/her audience and ensuring compliance with community guidelines.

Session controller 304 may further communicate with session builder 302 to allow a creator to schedule a future communication session and allow users to répondez s'il vous plait (RSVP) for the communication session and charge for the communication session. In some embodiments, session controller 304 and session builder 302 provide an option (e.g., 538) for a creator to schedule a communication session in the future. In some embodiments, the creator may input the date and time of communication session (e.g. using a widget). For example, upon the creator's schedule input, session controller 304 may change the option (e.g., the text on an action button) to "schedule," and cause a calendar invite for this scheduled communication session to be downloaded and displayed to the creator. When the creator selects the "schedule" option, session controller 304 may also send a push notification and/or in-app notification to all followers of the communication session, and cause the scheduled communication session to appear in a "starting soon" section of the main feed of the current communication session.

In some embodiments, session controller 304 works with analytics engine 306 (described below) to sort the communication sessions in the "starting soon" section. For example, the first session(s) may be the session(s) that is starting the soonest. In some embodiments, analytics engine 306 may determine a quality score that measures quality of engagement between the audience and the creator in communication sessions. This score is determined based on signals of quality of content rather than popularity of a communication session. Session controller 304 may sort the communication sessions in the "starting soon" section based on the quality score. In some embodiments, the quality score may be determined based on metrics including, but is not limited to: a number of communication sessions and/or replay shares, a number of live listeners/viewers, a number of positively engaged users (e.g., the sentiment order is above zero), a total number of listens or replays, broadcasts during communication sessions, a number of audience who listened/viewed to over a threshold percentage (e.g., 70%) of the communication session/replay duration, a number of RSVPs to the communication session, etc.

In some embodiments, upon a user selecting a profile image of a creator (e.g., 542), session controller 304 may cause a list of communication sessions to be displayed to the user such that the user can determine to which scheduled communication sessions he/she may RSVP. Upon a user selecting an RSVP option, session controller 304 detects this selection and causes the GUI to be updated, e.g., with a top toast ticker such as "ticket emoji" or "RSVP sent," to confirm the RSVP selection. For a user who has selected one or more upcoming communication sessions, in some embodiments, session controller 304 may cause an "admit one" ticket to appear in the main communication session feed (e.g., on the top right corner) and, also add the communication sessions to the "RSVP'd" section of the selecting user's profile. The user profile may be an in-application profile or a public profile, which will be described below with reference to FIGS. 10A and 10B. When the user selects the ticket emoji, session controller 304 would open up the profile for the user. Session controller 304 includes the communication sessions that the user has RSVP'd in the user's profile and allows the user to share each of the communication sessions.

In some embodiments, session controller 304 along with other modules may provide a creator with visibility to heavy-hitting users who plan to participate in the creator's future communication sessions. With such information, session controller 304 may assist the creator in enhancing the content generation and encourage participation of popular creators.

Completing Communication Session

When a user ends his/her participation in a communication session, session controller 304 may prompt the user to follow the speakers in the communication session. In some embodiments, analytics engine 306 (described below) may provide speaker analytics such as a total number of listeners, a sentiment percentage, segments of the communication session having most or least engagements, etc., and session controller 304 may prompt or allow the speaker to create a clip of audio/video from the segments having the most audience engagement. In some embodiments, the most engagement represents a maximal number of audience engagement, and the least engagement represents a minimal number of audience engagement.

To complete a communication session, session controller 304 may combine with distribution module 310 (described below) to help a speaker or a creator to publish the pre-recorded communication session. In some embodiments, these modules (e.g., 304 and 310) may link the content of the communication session to a profile of the speaker, such that users may consume the content at a later time while interacting with the content (e.g., express sentiment, share, etc.). The communication session can be automatically transcribed. Once the communication session is complete, session controller 304 and distribution module 310 also make the transcript of the communication session available to users who may consume the content after it has been published.

Figure 6A:
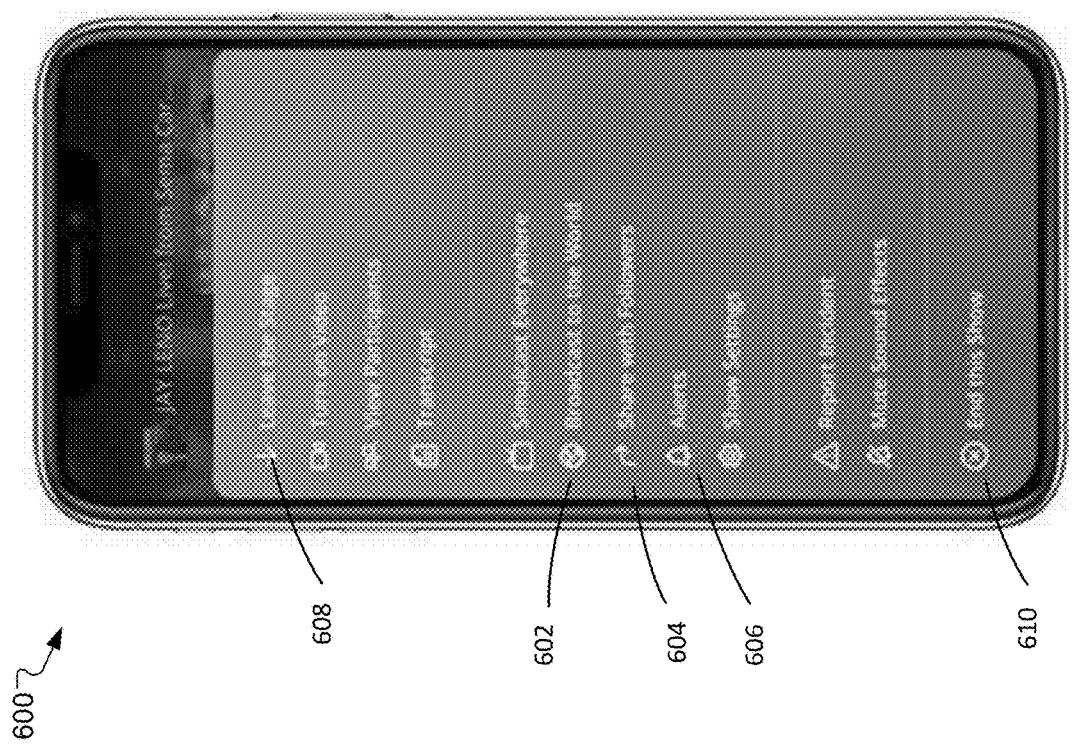
FIG. 6A illustrates an example user interface showing creator controls during a communication session, according to some embodiments.

FIG. 6A illustrates an example user interface 600 showing creator controls during a communication session, according to some embodiments. As depicted, a creator may broadcast 602 the content of the communication session to multiple platforms (e.g., to a linked platform such as YouTube), share 604 the content with followers on a platform, set up 606 alerts, leave 608 the stage, end 610 the communication session, etc.

In some embodiments, session controller 304 and distribution module 310 may also allow a speaker to broadcast the content to his/her followers or to all users, where the speaker is associated with new listeners or viewers after sending them a link to the content. Session controller 304 may communicate with a monetization module (not shown) to determine compensation for the speaker based on a monetization mechanism. The monetization mechanism may be based on the number of listeners/viewers who are driven to the platform by this particular speaker. A listener/viewer may also invite new listeners/viewers and receive compensation for sending out the invite.

Figure 6B:
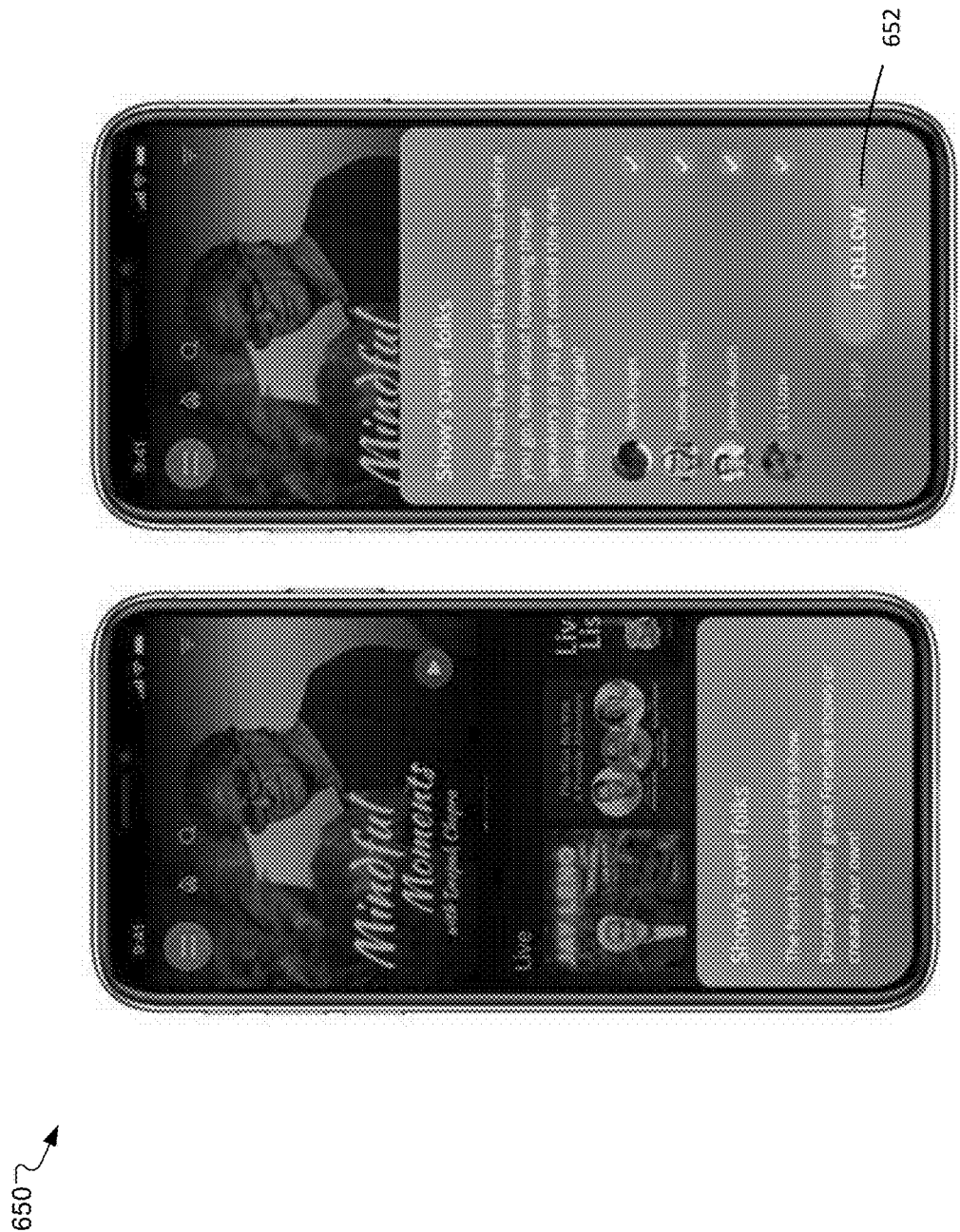
FIG. 6B illustrates an example user interface for completing a communication session, according to some embodiments.

Once a communication session is completed, session controller 304 in combination with other modules of content management application 122 may further process the data related to the communication session. For example, a variety of insights and/or recommendations may be generated for review by creators, content of the communication session may be edited (e.g., adding a preview clip, cover and description different insights), the communication session may be shared by the creator and becomes public on both in-app and public profiles of the creator, participants may be notified of the communication session and speakers may receive their speaking insights when the communication session is shared. FIG. 6B illustrates an example user interface 650 for completing a communication session, where a user may make a selection indicating which speakers they would like to follow in 652.

While the insights, recommendations, or other results are displayed to users after the completion of a communication session, it should be noted that at least a portion of operations for generating these results are implemented during the communication session. The real-time analysis for an ongoing communication session significantly increases the efficiency and accuracy of data processing, which in turn enhances the content generation.

Generating Communication Session Insights

Referring back to FIG. 3, analytics engine 306 processes the data associated with one or more communication sessions to generate different types of insights. The data may be any type of data generated within a communication session such as text messages, voices, audios, emojis, Animojis, gestures, etc. Analytics engine 306 may generate the insights respectively for creators, speakers, or other users. The insights may be based on understanding audience and content and used to enhance content editing and generation. The insights may also be based on the analysis of content replay and used to improve content generation over time.

In some embodiments, analytics engine 306 may collect the sentiments from audience, analyze the sentiment data, and determine feedback to provide to the creator(s) and/or speaker(s) of the communication session in near real time. For example, the audience members may input emojis (e.g., as shown in FIG. 5B) or Animojis to represent their feelings about the content of the communication session at a given time point. An Animoji is an animated reacting emojis. Analytics engine 306 may identify an emoji sentiment trend based on analyzing the emojis or Animojis from the audience and present this trend to producers and creators in real time to enhance content quality on the fly. Analytics engine 306 may also analyze the audience sentiments to determine one or more segments of the communication session that have the most or greatest audience engagement. Therefore, analytics engine 306 may timely provide a creator with feedback on the content. For example, when a large number of negative sentiments (e.g., above a pre-defined threshold) are being expressed by the audience members, analytics engine 306 may cooperate with session controller 304 to moderate the communication session (e.g., removing a user from stage) and/or hold the creator accountable (e.g., as described below with reference to accountability module 314).

In some embodiments, analytics engine 306 may assign a sentiment value to each user reaction and combine these sentiment values into a score. This score may be presented graphically to creators over time such that the creators can review live or historical sentiment when driving decisions about future content generation.

In some embodiments, when communicating with edit module 308 to edit the content with audio filter(s), analytics engine 306 may use one or more custom algorithms to measure audience responses in the communication session and equate the responses to a sound impact in a live venue. A sound impact or effect is an artificially created or enhanced sound. In some embodiments, analytics engine 306 may identify a type of audio/sound reactions from the audience responses, determine an amount of the type of audio reactions in a pre-defined time period, and determine, based on the determined amount, whether and to which sound effect this type of audio reactions may be categorized into. In other words, analytics engine 306 recognizes and customizes the differences between different amounts of audio reactions such as cheers, claps, laughing, celebration, etc. For example, when a user in the audience claps, analytics engine 306 captures it and takes it as an individual clapping sound. When a number of users (e.g. above a first threshold) clap within a timeframe, e.g., five users clapped within one minute, analytics engine 306 shifts the individual clapping sound to a round of applause. In some embodiments, analytics engine 306 may also customize the same type of audio reactions based on the size of audience. That is, analytics engine 306 may determine two different sound effects when six people clapped among 6000 audience and when five people clapped among 30 audience. Analytics engine 306 may also modify the first threshold for categorizing audio reactions according to the size of audience.

In addition to an amount of the audio reactions, in some embodiments, analytics engine 306 customizes audio reactions based on other criteria such as a participation rate, a location, etc. For example, analytics engine 306 gives applause only if audience reactions, from one side/location of a debate, reach a customization threshold. Further, analytics engine 306 applies different algorithms in customizing audio reactions depending on whether the communication session is held in a virtual indoor or outdoor environment. In other embodiments, analytics engine 306 changes audience audio reactions to sound effects based on the distance of sound. In some scenarios, when an audience reacts in a communication session or a show, the audience sounds like that he/she is far away from the stage. The audience's sound may be heard, but is often taken as a distant noise. Analytics engine 306 may customize these kinds of sounds by turn them into certain sound effects (e.g., laughing, clapping, etc.) that can be used in the show.

By mapping different audio reactions to different sound effects, analytics engine 306 creates a custom sound board including the custom sound effects. In some embodiments, analytics engine 306 may allow producers and creators to use the custom sound board during their communication sessions (e.g., shows) and when they react to the content. In other embodiments, analytics engine 306 may also allow audience and creators to record their own sound effects tracks and create their own custom sound boards. For example, the audience and creators may record their own audio reactions such as laughing, clapping, or celebrating included in the communication sessions.

In addition to the sentiment analysis, analytics engine 306 may also analyze user interaction data (e.g., based on demographic information such as location, age, education level) to identify user behavior patterns. For example, analytics engine 306 may determine the average time that users spent on viewing different segments of the content of a communication session, location-based preference differences on content topic, etc. Analytics engine 306 may also determine users' domain expertise in a topic area, e.g., based on the transcription and artifact information across multiple pieces of content, and identify a domain expert.

In some embodiments, analytics engine 306 may use sentiment values, scores, and other data (e.g., user feedback, pattern data, demographic information) as input to one or more ML models and train the one or more ML models to perform analytics on the data associated with the communication session. The one or more models may be a logistic regression model, a support vector machine (SVM) model, a cluster model, etc.

In some embodiments, analytics engine 306 may analyze audience/user interactions to generate at least live communication session insights, speaker insights, and replay insights. Each insight includes at least measurements of a set of metrics determined by analytics engine 306. In some embodiments, analytics engine 306 only provides the live communication session insights or content insights to creators, provides the speaker insights to speakers, and provides replay insights to both creators and speakers. Different types of insights are used to improve content quality and increase audience engagement in current and future content generation.

In some embodiments, analytics engine 306 may generate the content insights based on a set of metrics determined for a creator of a communications session. The set of metrics includes, but is not limited to: a total number of listeners or viewers, a number of shares, a number of broadcasts, a number of reactions, a number of speakers, percentiles of listen/view time by audience, a number of new follows, average sentiment value/score, most and least engaged segments of the media stream/content of the communication session, sentiment levels across segments of the media stream/content of the communication session, demographic info such as location, etc.

In other embodiments, analytics engine 306 may generate the speaker insights based on a set of metrics for a speaker of the communication session. The set of metrics includes, but is not limited to: how many listeners/viewers were most engaged, how many listeners/viewers were least engaged, a total number of listeners/viewers, a sentiment percentage, an indication of how many speakers broadcasted the communication session, how many users shared the communication session on the platform, and how many new followers did the speaker obtain from the communication session, etc. Analytics engine 306 may also provide the speaker a link to the segment(s) of the audio/video where the most engagements happen, such that the speaker may create a clip of the audio/video from the segment(s) that had the greatest audience engagement.

In yet other embodiments, analytics engine 306 may communicate with content consume module 312 to collect feedback data after users view the replay of a communication session. Using the collected data, analytics engine 305 may train one or more ML models to generate the replay insights based on a set of metrics determined for both the creator(s) and speaker(s) of the communication session. The set of metrics includes, but is not limited to an average listen time, users who followed the creator/speaker or requested access after listening to/viewing the replay, users who shared the replay, a number of replay shares, peak listens/views (e.g., portions of the communication session that are frequently listened to or viewed during the replays), when users stop listening or viewing (e.g., indicating the about when content or what types of content become less interesting), etc.

Figure 7A:
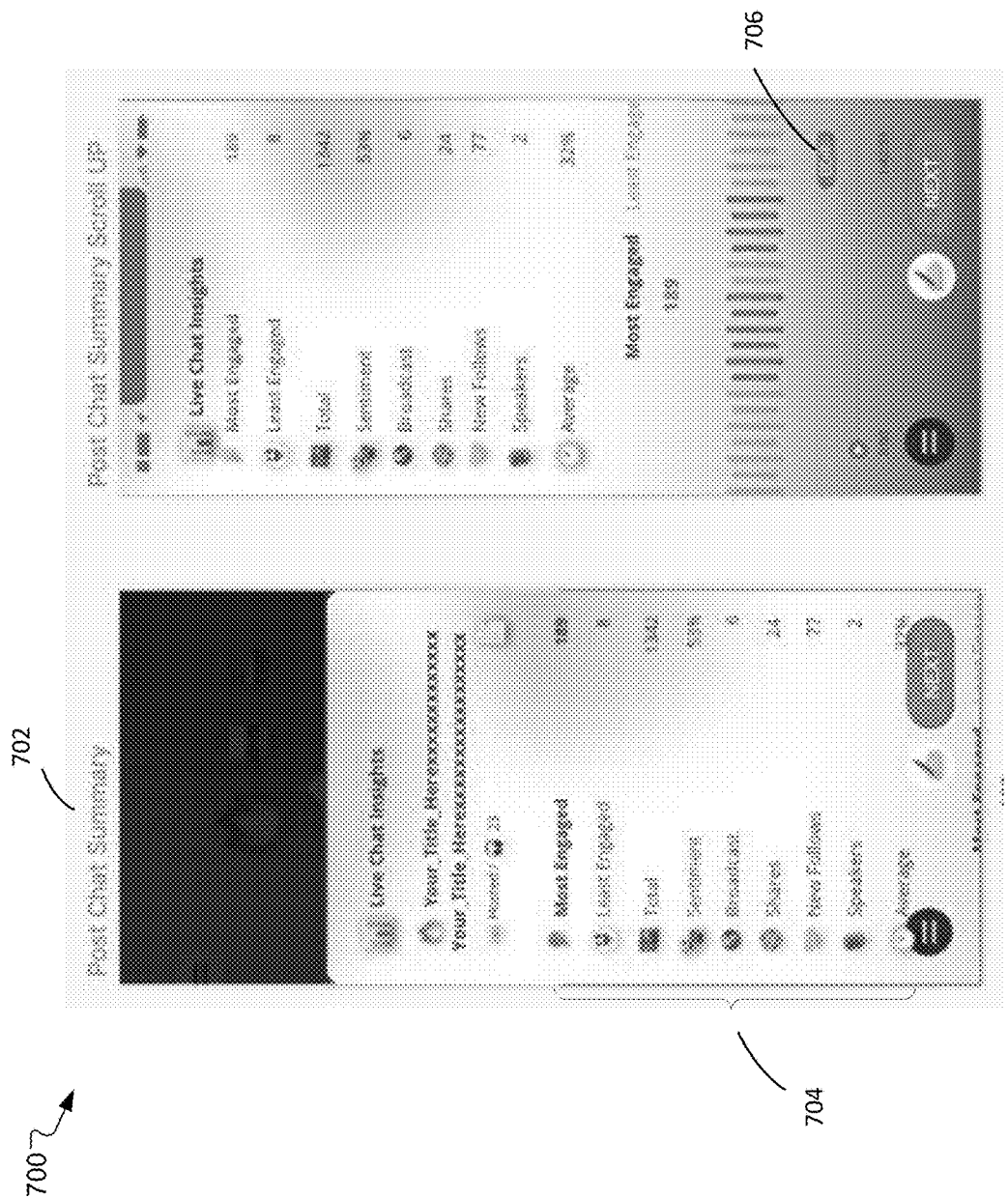
FIG. 7A illustrates an example user interface showing insight summaries of a communication session, according to some embodiments.

In some embodiments, analytics engine 306 may communicate with user interface module 318 to present analytics/insights to creators and speakers for them to better understand what content to continue creating or to avoid in order to increase audience engagement. FIG. 7A illustrates an example user interface 700 of insight summaries generated for a communication session, which may be presented to both the creator/host and speakers after the communication session ends. In some embodiments, the insight summary (e.g., 702) includes a list of metrics 704. As depicted, metrics 704 that are associated with a live communication session and generated for a creator may be presented in order of priority as follows:

Most Engaged: a number of total reactions by unique/active users;

Least Engaged: a number of users that either left the communication session or did not react at all while listening/viewing the communication session;

Total: a number of total listener/viewers, e.g., the highest number of worldwide audience at any point of time during the communication session;

Sentiment: a percentage of positive emojis used in the communication session;

Broadcasts: a number of broadcasts during the communication session;

Shares: a number of users invited to the communication session by participants;

New Follows: a number of follows received during the communication session;

Speakers: a list of speakers in the communication session;

Average Listen Time: an indicator to creators about whether users are interested in in-depth long conversations or short conversations.

Figure 7B:
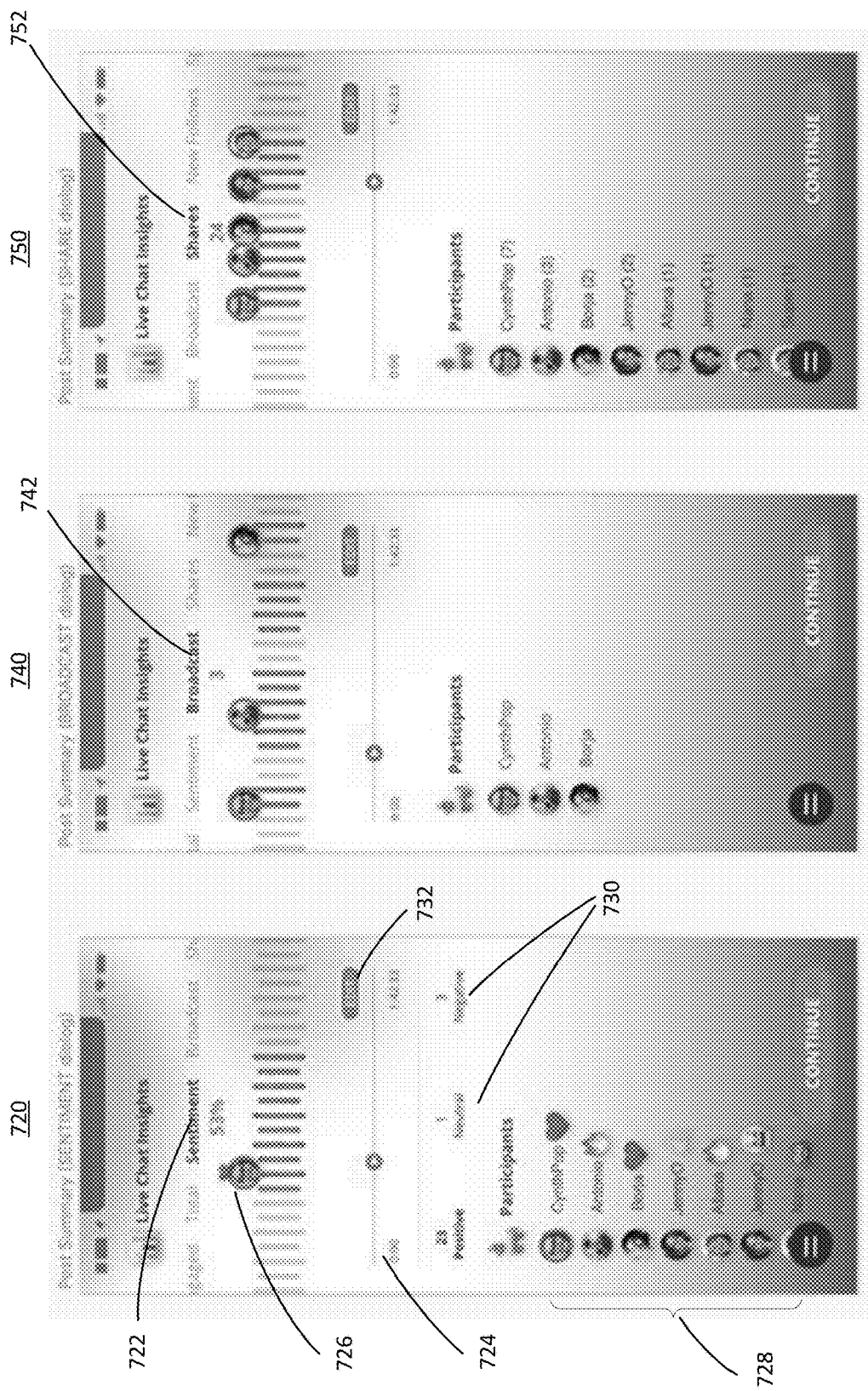
FIG. 7B illustrates example user interfaces resulting from the metric selections, according to some embodiments.

Analytics engine 306 allows a user to interact with each of the metrics. In some embodiments, once the user selects/clicks on a metric, analytics engine 306 may instruct user interface module 318 to update the GUI with an audio/video section associated with the metric. FIG. 7B illustrates example user interfaces resulting from the user's metric selections. Each of GUIs 720, 740, and 750 respectively corresponds to the user's selection of "sentiment" metric 722, "broadcast" metric 742, and "shares" metric 752. Each GUI includes an audio section (e.g., 724) with an audio that the user can play, a first section of relevant participants that the audio references (e.g., 726), and a second section of relevant participants that the metric references (e.g., 728). Although merely an audio section is displayed in GUIs 722, 742, and 752, in other embodiments, a video may also be identified and displayed to the user for viewing. The audio/video in each GUI is identified for different metrics. For example, GUI 720 includes a portion the audio related to the positive sentiment of a particular user. GUI 720 further includes the number of users who show neural or negative sentiments (e.g., 730). When a user selects "edit" option 732, analytics engine 306 communicates with edit module 308 to edit the content of the communication session.

Figure 7C:
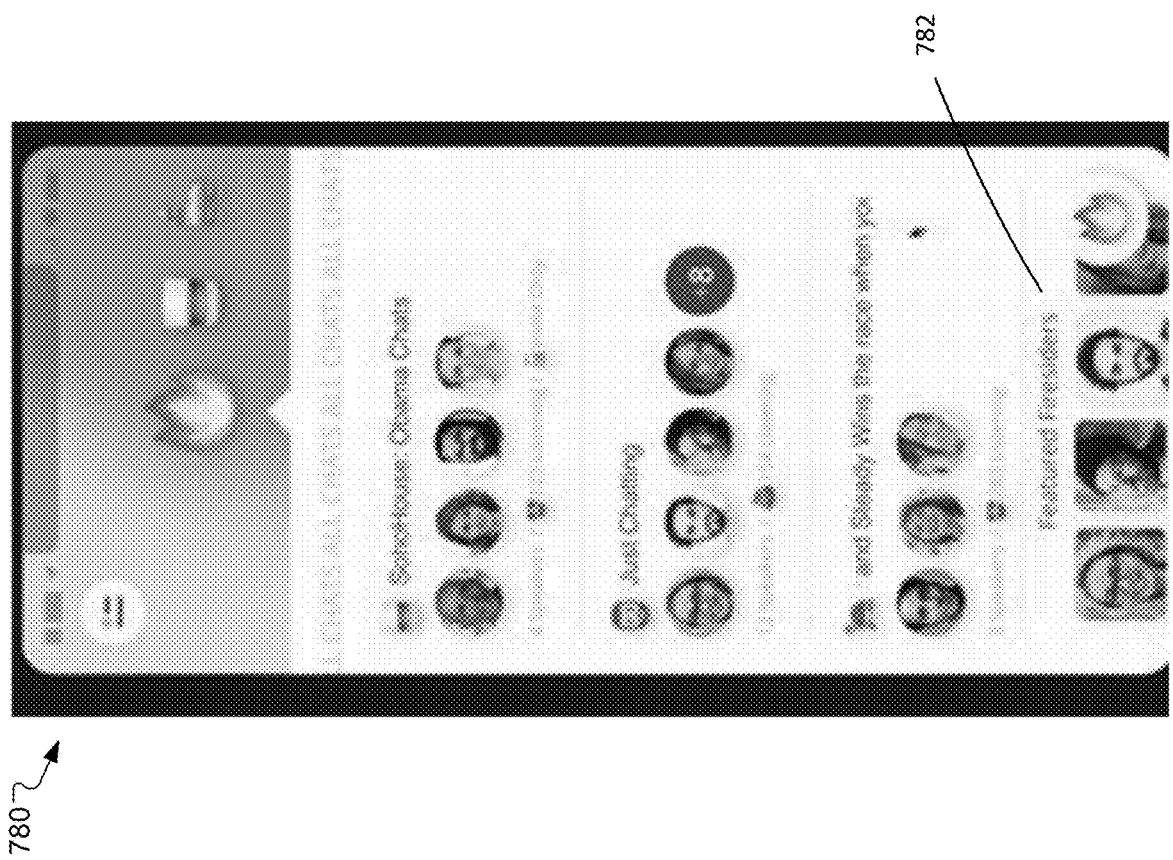
FIG. 7C illustrates an example user interface showing featured users in a main communication session feed, according to some embodiments.

In addition to generating and providing summary analytics to users with different roles, in some embodiments, analytics engine 306 also analyzes the communication session data to determine featured users. In some embodiments, analytics engine 306 may identify one or more featured users based on one or more of the following metrics: the creators and speakers with the highest amount of replays, the user having most followers, the user having a highest overall engagement, the user having a maximal number of communication sessions, the user having the largest total amount of time (e.g., minutes, hours) of content created, the most active creators on the platform (e.g., based on frequency of login and time using software application 102), a ratio between follower and engagement, etc. When a different combination of metrics are used, analytics engine 306 may determine a different selection of users as featured users. FIG. 7C illustrates an example user interface 780 showing featured users in a main communication session feed. This feed shows all live communication sessions as well as "Featured Users" 782 displayed below in the feed.

Editing Communication Session Content Based on Insights

Referring now to FIG. 3, edit module 308 allows the creator of a communication session to leverage and interact with the analytics/insights/metrics to edit the audio/video of the communication session prior to publishing or sharing the content.

Figure 8A:
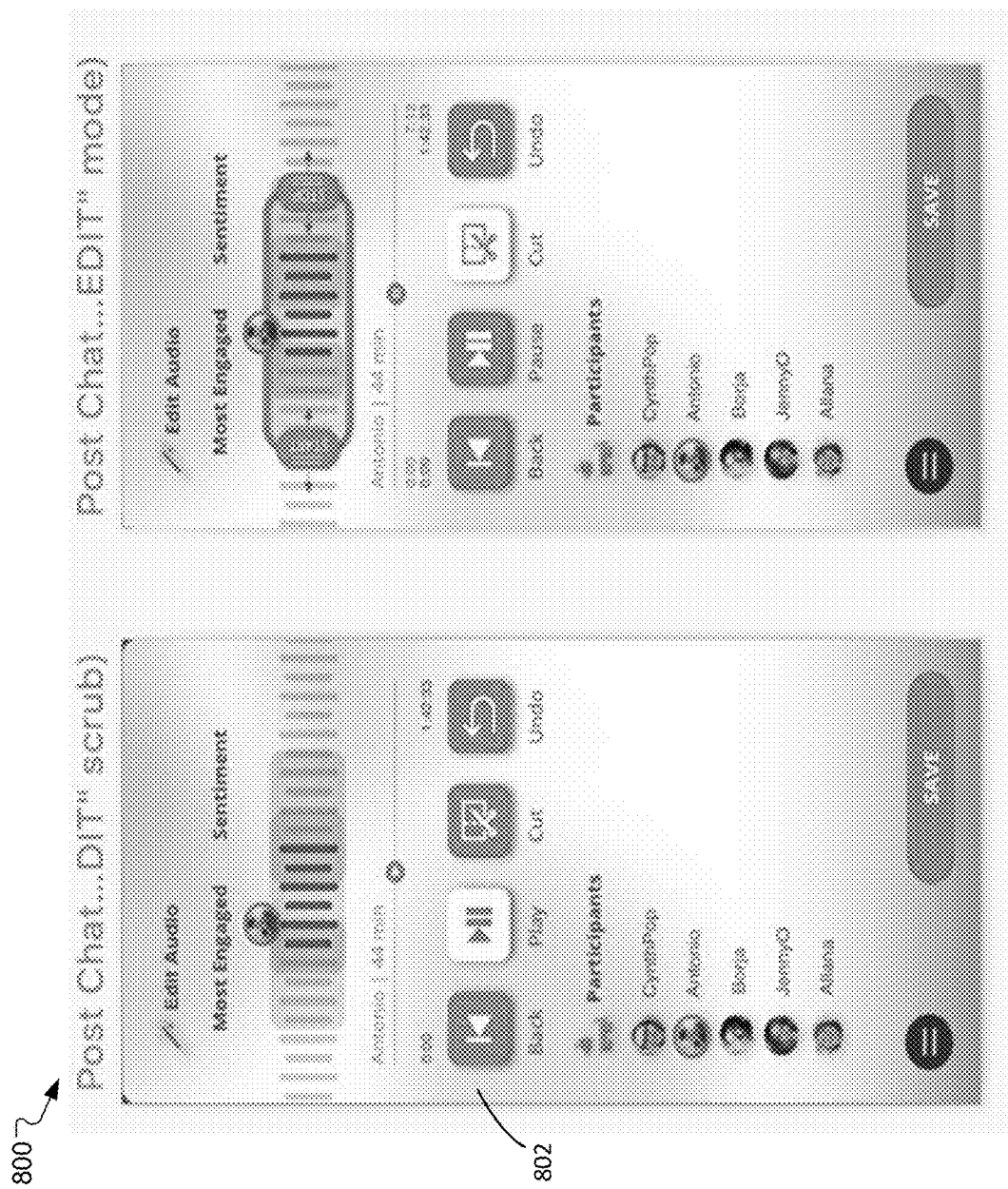
FIG. 8A illustrates an example user interface for providing an editing option, according to some embodiments.

In some embodiments, edit module 308 allows the creator to edit the content of the communication session based on one or more metrics/insights, e.g., key insights. A key insight is an insight that is particularly important to quality content generation, which may be manually determined or identified by analytics module 306. For example, for a breaking news, analytics module 306 may determine the key insight is the number of followers rather than the engagement. FIG. 8A shows that a creator may edit the content using two key insights: the "most engaged" and the "positive sentiment." When the creator plays the portion or multiple portions of the "most engaged" parts of the communication session and selects an "edit option" (e.g., option 706 in FIG. 7A) at any point of time, edit module 308 may cause an editing section 802 to be displayed in GUI 800 of FIG. 8A. A creator may use the tools in editing section 802 to edit the content. FIG. 8B provides another option 852 for the creator to edit the content. In some embodiments, edit module 308 may instruct user interface module 318 to generate GUI 800 of FIG. 8B after the communication session ends.

Edit module 308 may use editing section 802 as well as other editing tools (not shown) to enable the creator to at least highlight a clip, perform full audio/video editing, add a cover image, add a description (e.g., text), quickly share the content to one or more followers and participants of the communication session, externally share a spreadsheet, etc. To perform the full audio/video editing, edit module 308 may allow the creator to determine where the audio/video recording starts and stops for the full length of the communication session. Edit module 308 may further allow the creator to edit the content based on user roles in the communication session. A user role may be a listener, a speaker, a producer, a replayer, a crew, a guest, a co-host, etc. For example, edit module 308 may generate a clip of the communication session including only speakers and listeners.

In some embodiments, edit module 308 uses different filters, e.g., audio filters, video filters, to edit the content of a communication session. For example, using an audio filter, edit module 308 may reduce the background noise, modulate voice, automatically censor the communication session (e.g., based on time-synchronized transcript), remove prolonged silences, remove filler words (e.g., um, ah, like), inject sounds like music or sound board noises, etc.

When using the audio filter to edit the content, edit module 308 may also communicate with analytics engine 306 to perform advanced sound effect processing. For example, when a number of user claps are received within a timeframe, analytics engine 306 may customize the claps into a round of applause and make the applause (e.g., custom sound effect) available to the creator. As a result, edit module 308 may allow the creator to use the round of applause when editing the content. In some embodiments, edit module 308 allows the creators and producers of a communication session to use a custom sound board including custom sound effects to edit the content of the communication session.

In some embodiments, edit module 308 also interacts with a content converter module (not shown) to convert the content of the communication session into different formats such as audio recording, text transcription, videos of screen shots, etc. In some embodiments, edit module 308 overlays the text transcript along with the content insights on top of the audio and video files of the communication session. Therefore, edit module 308 may remove section(s) of the communication session (e.g., a show) with one or more taps from both audio and video file. Edit module 308 may edit the transcript and remove sound effects with one tap such that the edited content is natively formatted for one push distribution (e.g., when the content is distributed as a podcast).

In some embodiments, edit module 308 may further include a community tool. The community tool allows a creator to manage (e.g., own) the relationship with his/her audience and effectively use the relationship based on the insights generated by analytics engine 306 for both the purpose of collaborative content creation as well as monetization. For example, the community tool may allow a creator to invite his/her community members to create content together with the creator in the creator's communication session based on at least one of location(s), interest(s), or followers. The followers can be super followers or true fans. In some embodiments, the community tool may communicate with analytics engine 306, distribution module 310, or accountability module 314 to perform the functionality described herein. In other embodiments, the community tool may also be part of analytics engine 306, distribution module 310, or accountability module 314.

Once a creator has edited and published the communication session, all participants in the communication session may receive an in-application or in-app notification such that they may share the communication session externally.

Distributing Communication Session Content

There are many ways that a communication session may be distributed. Distribution module 310 allows the communication session to be distributed both live and on-demand. For live distribution, as described above, session controller 304 may work with distribution module 310 to help users to simulcast the communication session while recording live on a variety of platforms such as YouTube®, Facebook®, Twitter®, Twitch®, etc., or to broadcast the communication session without content downloading (e.g., turning the communication session into a shareable link via browser). Distribution module 310 also allows easy and convenient on-demand content distribution. For example, distribution module 310 may allow the communication session to be distributed as a podcast with one tap. Distribution module 310 may automatically share the content of the communication session across participants and host networks. It should be noted, in some embodiments, distribution module 310 communicates with session controller 304 to perform the above functionalities. It should also be noted, if a creator does not share the communication session, the communication session will stay in a draft state in the creator's profile, where the creator may revisit to edit and share.

Distribution module 310 integrates with other entities of the present platform to provide creators the ability to broadcast the content they create (e.g., live and recorded) to reach the largest number of consumers, that is, to use APIs and SDKs for embedding and starting content generation in multiple systems such as websites, metaverse, etc. The metaverse is a shared virtual 3D world that is interactive, immersive, and collaborative. For example, distribution module 310 may syndicate the communication sessions created in the present platform to metaverse and create a metastudio. In the metastudio, users in the metaverse can create content and communication session with real-time feedback from audience and allow them to join virtual stage and be in the show.

Figure 9:
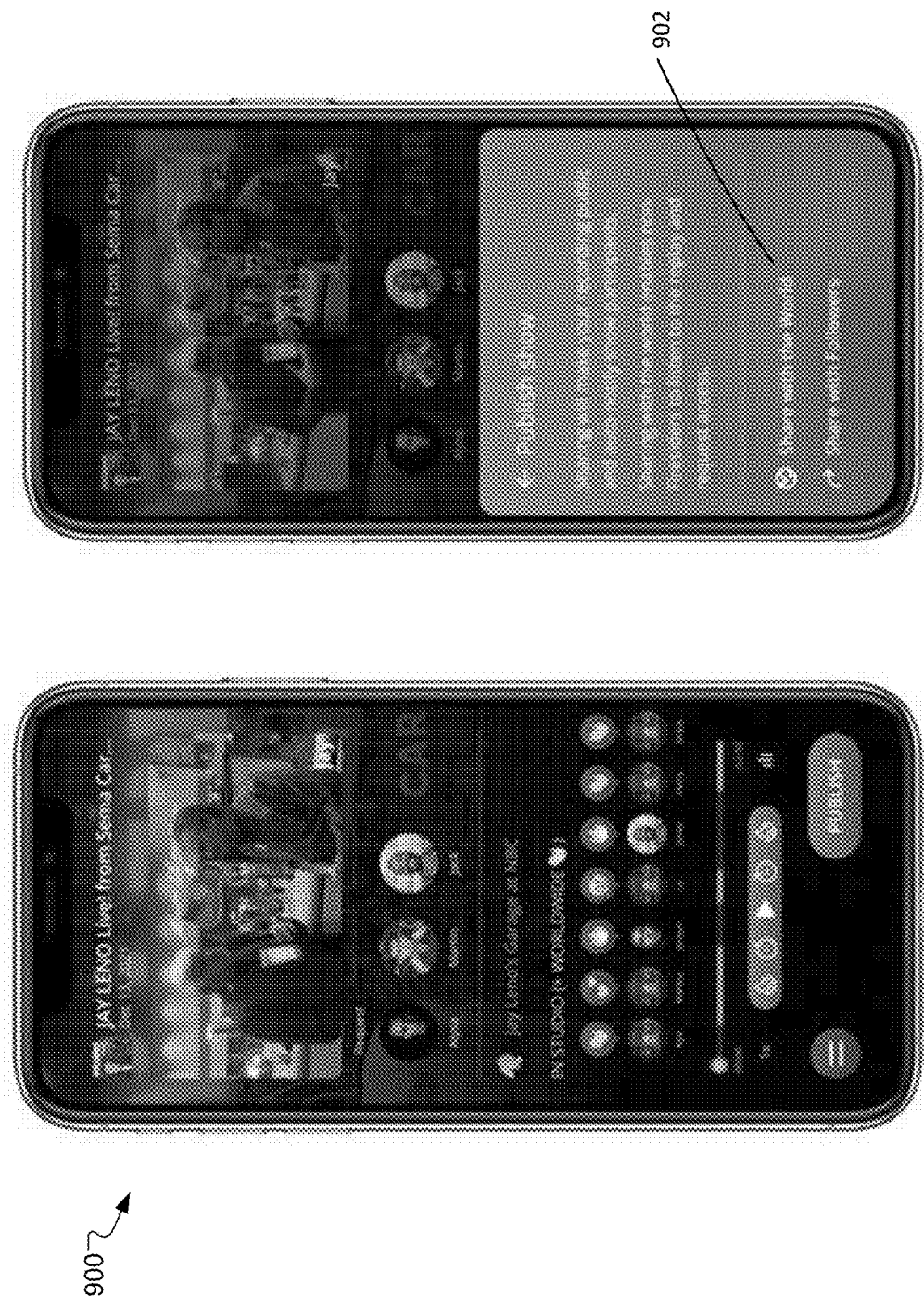
FIG. 9 illustrates an example user interface for distributing a communication session, according to some embodiments.

FIG. 9 illustrates an example user interface 900 for distributing a communication session, according to some embodiments. As depicted, distribution module 310 allows a user (e.g., a creator, a speaker) to select "share" tab 902 to make the communication session recording public to others. When the creator/speaker clicks "share" tab 902, distribution module 310 may cause a preview and sharing options to be displayed to the creator/speaker. The creator/speaker can see what content is about to be shared from the preview. The creator/speaker can also choose to share the content with followers or share externally using the sharing options.

If the creator/speaker chooses to share with followers, distribution module 310 may generate and send an in-app notification to the followers about this sharing. The in-app notification would be sent to all the followers if the creator shares and to a speaker's followers if a speaker shares. When a follower clicks on this notification, distribution module 310 may take the follower to a user profile, where the shared communication session is highlighted for replay.

If the creator/speaker chooses to share externally, distribution module 310 may use the same mechanism as broadcasting to share the communication session and associated preview (e.g., via Apple® iOS share sheet) on a third-party platform. When a user on the third-party platform selects the shared link, distribution module 310 may take the user to a public profile of the creator, where a non-registered user is allowed to view the replay and/or request access to view the communication session.

After the creator/speaker has shared the communication session, in some embodiments, distribution module 310 may also send an in-app notification to all participants of the communication session to ask them if they want to share the replay. When a participant clicks on this in-app notification, distribution module 310 may take the participant to his/her profile. The participant's profile displays the communication sessions the participant has participated in, where the participant may listen to or view the replay of this shared communication session and share the replay (e.g., via Apple® iOS share sheet). If the participant was a speaker in the shared communication session, the participant may also be able to view speaker insights and replay insights.

Updating User Profiles and Viewing Communication Session

Figure 10A:
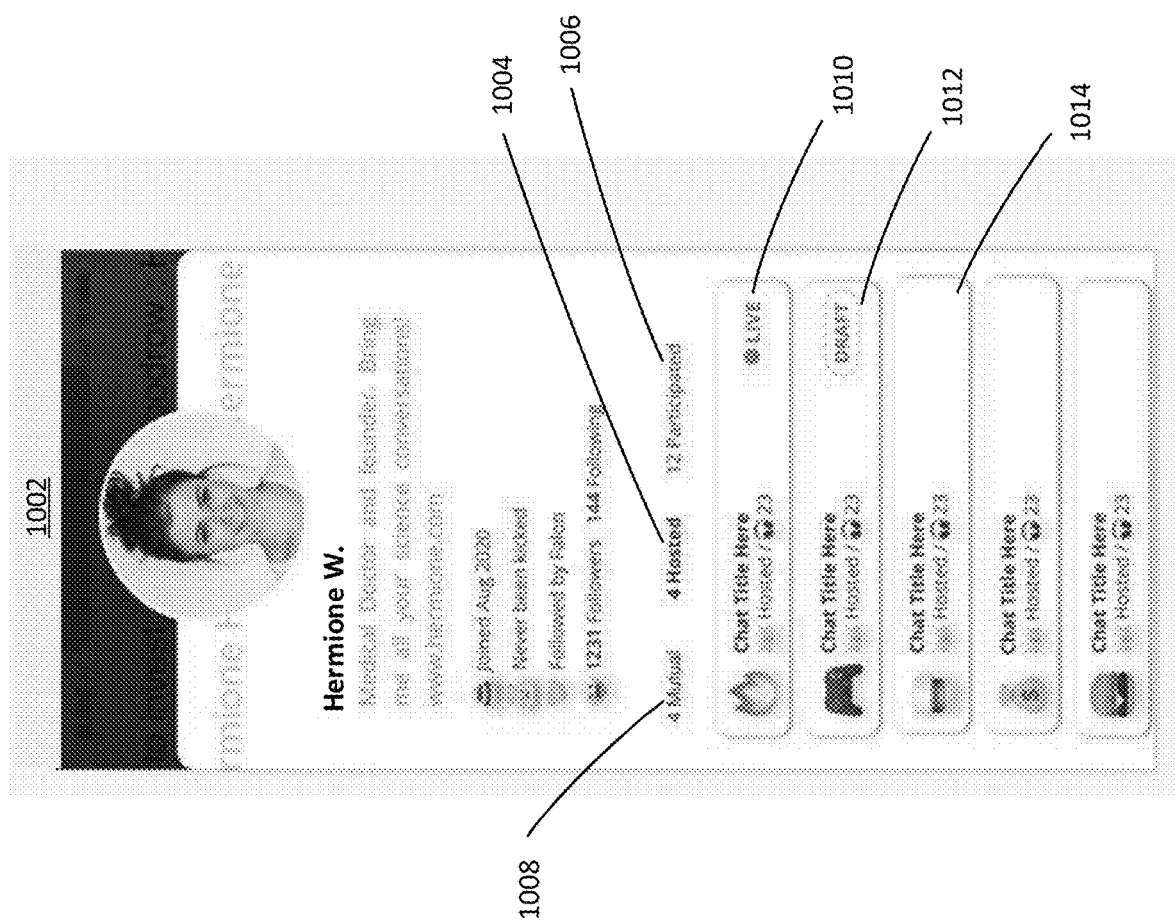
FIG. 10A illustrates an example user interface of an in-application profile, according to some embodiments.

As described above, each registered user has an in-app profile and a public profile to present the data received from the communications between software application 102 and server-side content management application 122. In some embodiments, content consume module 312 in FIG. 3 handles the creation and update of user profiles. FIG. 10A illustrates a GUI of an in-application profile 1002 associated with a user (e.g., Hermione W.), according to some embodiments. Profile 1002 shows whether the user is active and whether the user is live-streaming a communication session. As shown in FIG. 10A, profile 1002 includes a "hosted" tab 1004 and a "participated" tab 1006. "Hosted" tab 1004 includes all communication sessions the user has created. "Participated" tab 1006 includes all communication sessions the user has moderated, spoken, listened to, viewed, or replayed. When the user is looking at another user's profile, the user may also see, in "mutual" tab 1008, the mutual communication sessions they have both participated.

In some embodiments, when a creator shares a communication session, content consume module 312 may publish the communication session to the creator's profile, e.g., in "hosted" tab 1004 of FIG. 10A. In this tab, content consume module 312 may also display the live communication session(s) in 1010 hosted by the creator at the time a user is viewing. If the creator has not shared the communication session, content consume module 312 may save the communication session in a draft in 1012 on the creator's profile so the creator may publish/share it later. In some embodiments, content consume module 312 is configured to make the draft visible only to the creator. When the creator replays the draft, content consume module 312 may make the transcription of the communication session available for the creator's editing use.

In some embodiments, when a user selects container 1014 of a communication session for replay, content consume module 312 communicates with other modules of content management application 122 to open a replay screen for the viewing user. Content consume module 312 may place a label within the replay screen to show what type of participation the user had with the communication session. Depending on the role of the viewing user in the communication session, content consume module 312 may include one or more of the full audio/video of the communication session, transcript of the communication session, cover art, text description, preview clip, etc., in the replay screen.

When viewing the replay of a communication session, creators and speakers may revisit multiple types of insights discussed above with reference to analytics module 306. For example, the insights may be live communication session insights, replay insights, or speaker insights. In some embodiments, for a creator who is viewing his/her own profile, content consume module 312 allows the creator to access both the live communication session insights as well as replay insights within the replay screen, and further re-edit any communication sessions the creator has previously shared.

A speaker may view insights in a similar way as a creator. The speaker may leverage the insights to improve their content creation/contributions in subsequent communication sessions. In some embodiments, content consume module 312 allows the speaker to access both the speaker insights as well as replay insights within the replay screen, but leaves no editing privileges (e.g., read-only) to the speaker. For example, responsive to a speaker selecting a push notification and/or in-app notification received after a communication session completes, a speaker insights summary may be displayed in a replay screen for the speaker to interact with and further share the replay with the speaker's followers and/or externally.

In addition to the creator and speaker consuming the replay of a communication session in an in-app user profile, content consume module 312 also allows other non-speaker and non-creator users to discover and consume the replay. In some embodiments, a user may discover the replay of a communication session through the profiles of any registered user. The user is not a live communication session host, speaker, or participant of the communication session. When the user views the replay of the communication session, content consume module 312 may cause the communication session to be added to the viewing user's profile, e.g., in the "participated" section with the label "replayed."

As discussed above, content consume module 312 may provide a replay screen in an in-app profile for users to revisit a communication session. Additionally or alternatively, content consume module 312 may also provide users the ability to view a live communication session or a replay of the communication session through a public user profile webpage.

The in-app profile for every user has a public version. As shown in GUI 1050 of FIG. 10B, the webpage version of the profile includes an option 1052 for a user to request access to the present platform. If a non-registered user selects option 1052, profile manager 312 may generate a request access form for the user and associate the user with the key participants in the creator's most recent communication session.

Figure 10B:
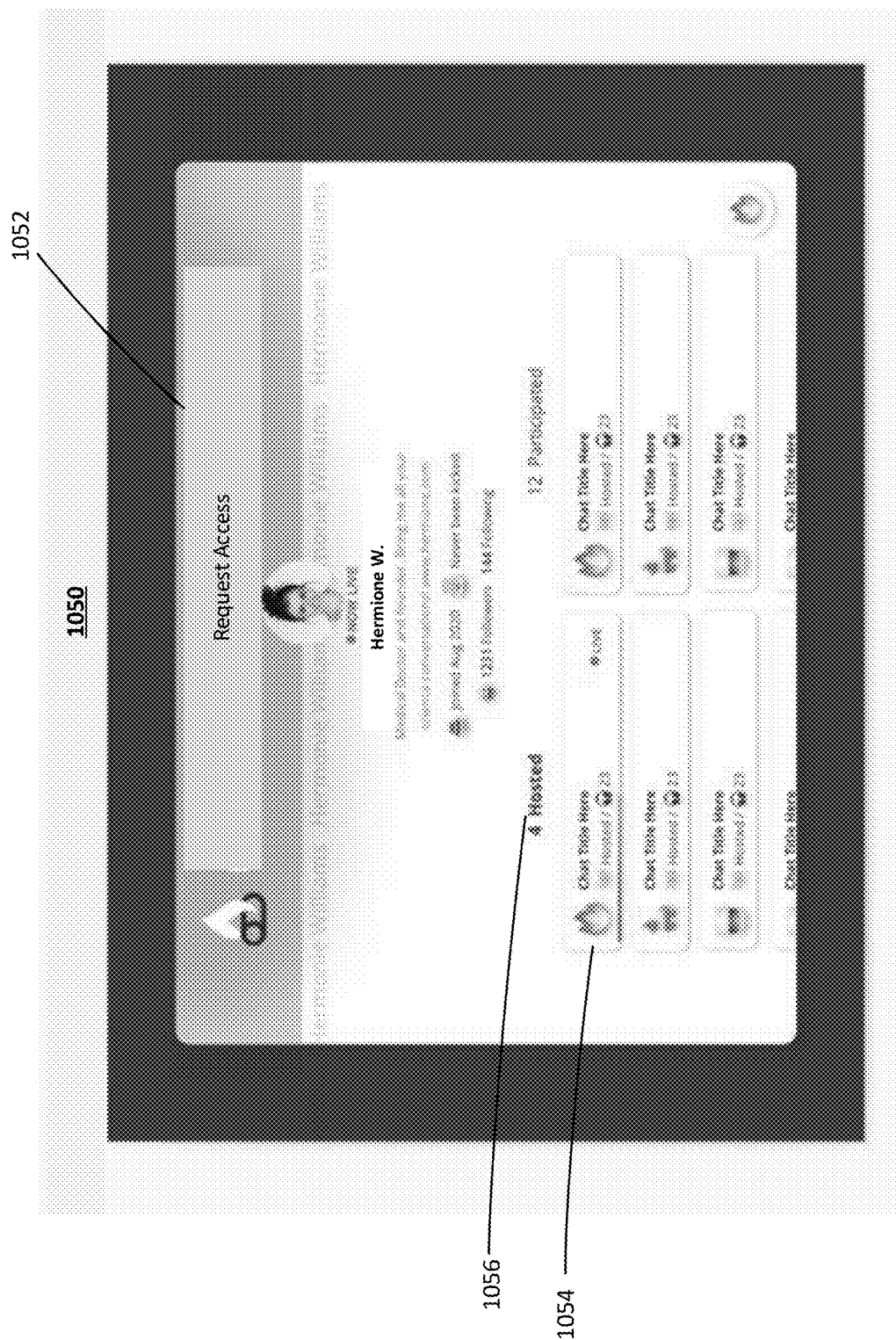
FIG. 10B illustrates an example user interface of a public user profile webpage, according to some embodiments.

There are serval ways for a non-registered user to discover a communication session and reach the "request access" webpage as shown in GUI 1050 of FIG. 10B. In some embodiments, if an active user of a communication session is livestreaming the communication session, the non-registered user may select this live stream, which then trigger content consume module 312 to redirect the non-registered user to the public broadcast page showing the live stream. In other embodiments, when a participant shares a replay of the communication session externally (e.g., via Apple iOS® share sheet), the non-registered user may use this link to go to the participant's public profile webpage. In yet other embodiments, if a creator or a participant of the communication session shares a link of the communication session, the non-registered user may be directed to the profile webpage of the creator or participant through the link. As shown in FIG. 10B, hosted communication session 1054 may be open for the replay, and "hosted" tab 1056 may be pre-selected.

Once the non-registered user gets the access and starts to view the communication session, content consume module 312 works with other modules e session controller 304, user interface module 318) to allow the non-registered user to select the participant emojis or Animojis and get information of all participants that links to their public webpage profiles, thereby facilitating the discovery of more content. In some embodiments, content consume module 312 along with other modules allows the non-registered user to click out of the content he/she is viewing (while still listening to the audio) such that the user can browse the other content on the webpage.

Figure 10C:
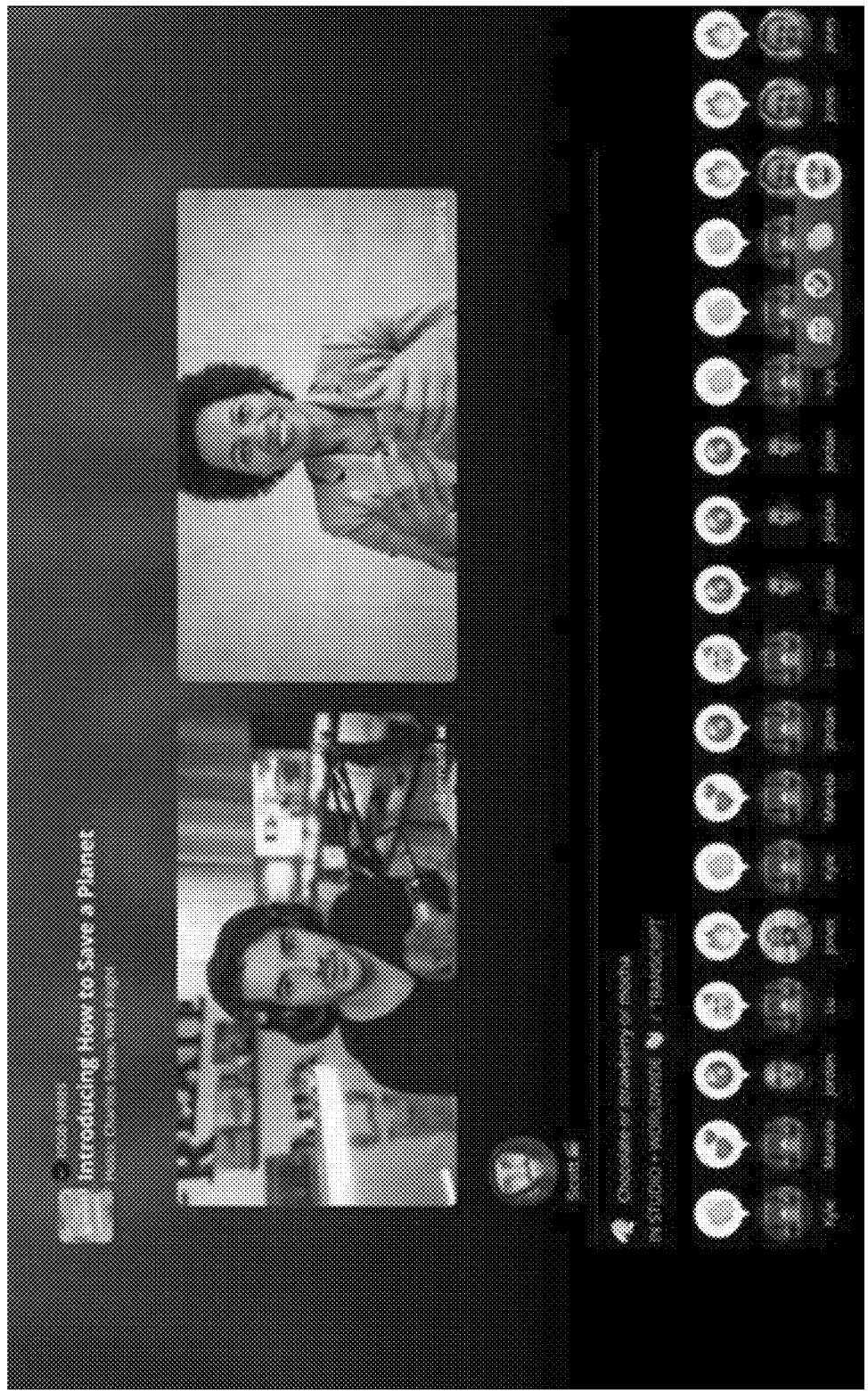
FIG. 10C illustrates example user interfaces related to a broadcast webpage, according to some embodiments.

In some embodiments, if a previously-selected broadcast share link is no longer live and has a saved recording, content consume module 312 may redirect the non-registered user to the creator's webpage, where the non-registered user may request access and listen to/view the recording of the communication session. As shown in FIG. 10C, the non-registered user clicks a link to the creator's profile and lands on the creator's public profile page to view the communication session.

Controlling Communication Session Based on Accountability

Referring back again to FIG. 3, as part of monetization, accountability module 314 manages the content and users in the present platform by scaling moderation that includes virtual goods. The present platform hosts communication sessions and manages content generation. For example, accountability module 314 may assign each user of the present platform a number of virtual goods (e.g., 10 tokens). A first user may spend a token to report a second user who authored or shared some content in the present platform. If the second user is suspended or warned, or the content from the second user is removed or specially labeled, the report is considered valid (e.g., by content producers) and sustained. As a result, the first user can get the token back. Otherwise, the first user loses the token. If the first user, i.e., the reporting user, spends all 10 tokens, then accountability module 314 will suspend or terminate the first user from the present platform. As to the second user, if his/her content (e.g., a post) is removed, the second user loses two tokens. Similarly, if the second user, i.e., the reported user, loses all 10 tokens, then accountability module 314 will also restrict the second user out of the platform. Therefore, accountability module 314 puts limits on how often certain behaviors (e.g., the first user tries to bully the second user by reporting the second user) can be done, and cause a user to be removed when the certain behaviors are too often and frivolous.

Advantageously, accountability module 314 may leverage gamification to reward positive engagement and penalize negative engagement. This drives increased engagement and retention with an incentive system, which benefits the present platform for a long term. Also, accountability module 314 is able to tie user engagement into monetization, which advances the incentive system and ultimately leads to more revenue over time. Accountability module 314 further categorizes users into tiers to facilitate a creator's ability to understand the value of users participating in a communication session. Moreover, accountability module 314 may improve the system performance by simplifying the measurement of user contribution, facilitating monetarization, introducing optional user subscriptions, etc. Accountability module 314 also benefits individual users, for example, avoiding excessively penalizing creators to incentivize them to be engaged for a long period of time and create quality content.

In some embodiments, accountability module 314 may consider the present platform with which users register as a credits platform. Upon registration, a new user receives a baseline credit. These credits act as a reputation and engagement mechanism for each user. For example, accountability module 314 may reward a user for meaningful engagement and positive behavior in the present platform such as streaks of creation, audience engagement, speaking with positive audience sentiment consistently, etc. Accountability module 314 may also penalize the user for negative engagement, e.g., by removing user access from the present platform when a user loses a certain amount of credits.

In some embodiments, accountability module 314 allows each registered user to leverage their credits on a regular basis (e.g., monthly) to receive a loot box. Accountability module 314 may randomly select a loot box for a user at a user/reputation tier (described below). The loot box may include a slot machine emoji, and the emoji is used to gift one or more free premium features. The user must use the free premium features in a next period (e.g., next month). Otherwise, the premium features may be removed from the user at that user tier. The registered user, however, may choose to upgrade to a paid option available for the current user tier such that the user can continue to use the premium features until the user is eligible for the next user tier.

Accountability module 314 allows the user to use a gift emoji to deliver application updates, featured replays, as well as the loot box slot machine on a predictable frequency. As a user increases engagement and reputation in the present platform, the user may graduate into new offerings (e.g., in a new user tier). The user may continue to trade in credits for loot boxes that provide better premium features over time, or alternatively, to pay a nominal subscription fee (e.g., monthly) to keep predictable premium features until the user gets advanced to a higher user/reputation tier.

In some embodiments, accountability module 314 may allow the reputation tier to be publicly displayed in the user profile of each user. This informs creators about who their follower is, to whom in the audience the creators may pay close attention, etc.

An example implementation of accountability module 314 is illustrated below with reference to tables 1 and 2. A person skilled in the art should readily recognize that any of the number of credits, the threshold numbers used in rules, and the rules can be added, removed or modified. In some embodiments, accountability module 314 assigns each registered user a baseline 10 credits. When the user engages in a communication session positively to increase his/her credits to 20, accountability module 314 determines that the user is qualified for an upsell option. When the user obtains additional 20 credits to make a total 40 credits, accountability module 314 determines that the user reaches the top of upsell option and can be moved to the next advanced tier. In some embodiments, accountability module 314 also provides a "public shout" feature to recognize the user achievement. When the user reaches a milestone of key participation (e.g., 40 credits) in the communication session, accountability module 314 enables the creator of the communication session to publicly announce the milestone and associated user in the live communication session that the user is participating in. Table 1 is an example tiering system with associated millstones.

TABLE 1

| User/Reputation Tiers | |
|---|---|
| 1:1 Credits For Communication Sessions Participated | Tier |
| 20 | Base Free |
| 25 | Base Upsell ($v/month) |
| 50 | Advanced Free |
| 100 | Advanced Upsell ($w/month) |
| 150 | Expert Free |
| 200 | Expert Upsell ($x/month) |
| 250 | |
| 300 | VIP Free |
| 350 | VIP Upsell ($y/month) |
| 400 | |
| 450 | Superstar Free |
| 500 | Superstar Upsell ($z/month) |

As shown in table 2, accountability module 314 also sets up the rules for rewarding and penalizing a user. For example, if a user loses 10 credits, accountability module 314 may remove the user from the present platform, where the user loses one credit for each of the offenses shown in table 2.

TABLE 2

| Rules for losing/gaining credits | |
|---|---|
| A user may lose credits when: | A user may gain credits when: |
| 1. the user is kicked out of from a communication session (i.e., kicking functionality); | 1. the user attends or hosts a communication session with meaningful participation; |
| 2. there is an incident reported about the user during a communication session (e.g. by creator/participant); | 2. the user receives a creator streak bonus; |
| 3. there is a user violation of community guidelines; | 3. the user receives a referral bonus; |
| 4. the user intentionally misreports other registered users; | 4. the user receives a speaker streakbonus/graduated functionality reward. |
| 5. the user misuses the kicking functionality. | |

A user may also gain credits as shown in table 2. In some embodiments, accountability module 314 may determine attending or hosting a communication session with meaningful participation counts as one credit. The meaningful participation in attending the communication session may occur when a user shares the communication session with a follower, speak in the communication session, or react in the communication session. Accountability module 314 may also determine a creator/host creates a quality communication session when (1) the communication session receives five new followers, (2) the listeners/viewers (e.g., (non-host or non-producer) broadcast the communication session and at least five requests are received to access the present platform as a result of broadcasting, (3) there are at least five replay listens/views, (4) there are at least five access requests from public profile page, or (5) there are at least five replay shares.

For the creator streak bonus, accountability module 314 may determine that a creator may obtain five points within 30 days if the creator creates four communication sessions within this period of time with meaningful participation from the audience and the creator achieves the creator loot box for his/her user tier. When a user refers a creator to the present platform, and the creator gets approved and consistently creates for 30 days, accountability module 314 may give two referral bonus credits to the referring user. In addition, accountability module 314 may further assign two extra bonus credits to the referring user every time this creator creates consistently. As to the speaker streak bonus, accountability module 314 may allow a user to apply as a creator when the user speaks 10 times in a communication session.

Accountability module 314 also introduces other features such as credit decays, notification, etc., to credit management in the present platform. In some embodiments, if a user, including a creator, is inactive or dormant for 30 days, accountability module 314 may start to decrease the user's credits. For example, the user may lose one credit each month. Accountability module 314 may notify the user of the credit decrease and inform the user that his/her credits will continue to decrease until the user engages consistently again in the present platform. The lowest credits a user may have are 10 credits in the free starting level. In other embodiments, accountability module 314 may also educate a user about the credit mechanism when the user achieves a qualified participation in the communication session.

Generally, when a user achieves 20 credits, that is 10 points more than the initial credits, accountability module 314 determines that the user is qualified for a base free loot box. The user has to use what he/she obtains via the loot box within the next 30 days, and, otherwise, the user may lose this loot box. Once the loot box is lost, the user has to continue to participate consistently in communication sessions to qualify for a base upsell tier or to get the option of the free loot box again.

When a user achieves 25 credits, accountability module 314 determines that the user is qualified for the base upsell tier. Once the user achieves 50 credits, the user would qualify for an advanced free tier. If the user gets 100 credits, then the user qualifies for an advanced upsell tier, and so on.

A creator may obtain all the benefits same as the other users. In addition, the creator may receive extra credits and awards for streaks of consistent and quality content generation, and get penalized for lack of consistent creation or engagement.

Generating Prediction and Recommendation

An overall procedure described in the present disclosure may include creating, editing and distributing content of a communication session. Each stage of the procedure may also include controlling communication session progressing (e.g., based on accountability), analyzing data exchanged in the communication session, determining useful insights, as well as generating predictions and recommendations. Referring to FIG. 3, recommendation module 316 may create a multi-dimensional space that promotes understandings across topics, communication sessions, entities in the present platform and generates recommendations.

Generally, recommendation module 316 may generate predictions and recommendations for talent, content, distribution, marketing, etc. In some embodiments, recommendation module 316 generates one or more talent predictions/ recommendations about guest/audience that can join virtual stage and be in a communication session or a show, or about user(s) who can co-hosts/cast and crew in the communication session. Recommendation module 316 also generates one or more content recommendations for the formats and topics of the communication session that may resonate with audience. Recommendation module 316 then generates one or more distribution predictions about where to distribute the content of the communication session and under what monetization terms to maximize return on investment (ROI). Recommendation module 316 may further generate one or more marketing predictions about whom should be invited to the communication session or show and how to market the show that is likely to achieve the maximum ROI.

In some embodiments, recommendation module 316 may provide recommendations to co-hosts of a communication session to connect with each other to collaborate on content generation. For example, recommendation module 316 may suggest which creators should work together in the communication session, which audience should be invited, which topics should be discussed, etc.

In some embodiments, recommendation module 316 may recommend content formats and topics related to a particular segment of users (e.g., creators). For example, analytics engine 306 may determine a user's domain expertise in a topic area using the transcription and artifact information across multiple pieces of content. Recommendation module 316 may make recommendations to creators for domain experts on a topic area.

In some embodiments, recommendation module 316 may recommend recorded and live content to users in a personalized manner. For example, each creator can edit and customize the content before it is distributed to users. Even in a live show, recommendation module 316 may recommend who can be on stage at a given point of time based on the real-time analysis of the show.

In some embodiments, recommendation module 316 may recommend customized clips to users that most likely follow creators and/or speakers and view the entire replay. Recommendation module 316 may also recommend creator subscriptions to users that most likely to convert.

In some embodiments, recommendation module 316 may further recommend sponsorships to creators and content to brands. Recommendation module 316 may intelligently recommend brands to sponsor creators and logistically handle the execution of enhancing content and communication session creation experience. For example, recommendation module 316 may allow a user to throw a Dominos® Pizza emoji on stage during a communication session sponsored by Dominos®, and, as a result, a pizza is delivered to the speaker's house. In some embodiments, a sponsor may identify user demographics and create whitelists/blacklists for creator topics. Responsive to receiving the whitelists/ blacklists from the sponsor, the system identifies creators and pairs the identified creators with the sponsor.

It should be noted, in addition to pairing creators and sponsors, recommendation module 316 may allow many other different activations, for example, a sponsorship activation. In some embodiments, recommendation module 316 may allow a sponsor or brand to take over the wallpaper of a communication session or a show. The sponsor may also brand the profiles of the creators of the show. The brand may further fund production of a series of content of the show through an entertainment portal of the present platform.

In some embodiments, recommendation module 316 may allow sponsors to choose specific creators they want to sponsor. The sponsor can then create custom wallpapers, emojis, virtual goods, and/or gaming mechanics. In some embodiments, recommendation module 316 may instruct the sponsor to use tools of a sponsorship portal integrated into the platform to easily generate wallpaper, emojis, etc. If an audience member uses the sponsored emoji as a reaction, recommendation module 316 would instruct a sponsorship module (not shown) to provide a unique content experience for everyone. For example, if Dominos® pizza sponsors Mark Cuban's show and a custom Dominos® pizza emoji is created, an audience in his show can throw this emoji on stage. As a result, every participant gets a Dominos® pizza gift certificate and a pizza shows up at Mark Cuban's home a few minutes later.

Advantageously, recommendation module 316 makes the above recommendations in order to improve content quality and increase audience engagement. More importantly, recommendation module 316 may communicate with analytics engine 306 to generate a hit recommendation about the likelihood that the content generated based on the recommendations becomes a hit. Such a hit prediction analytics in turn may significantly improve content quality and increase audience engagement.

Figure 11:
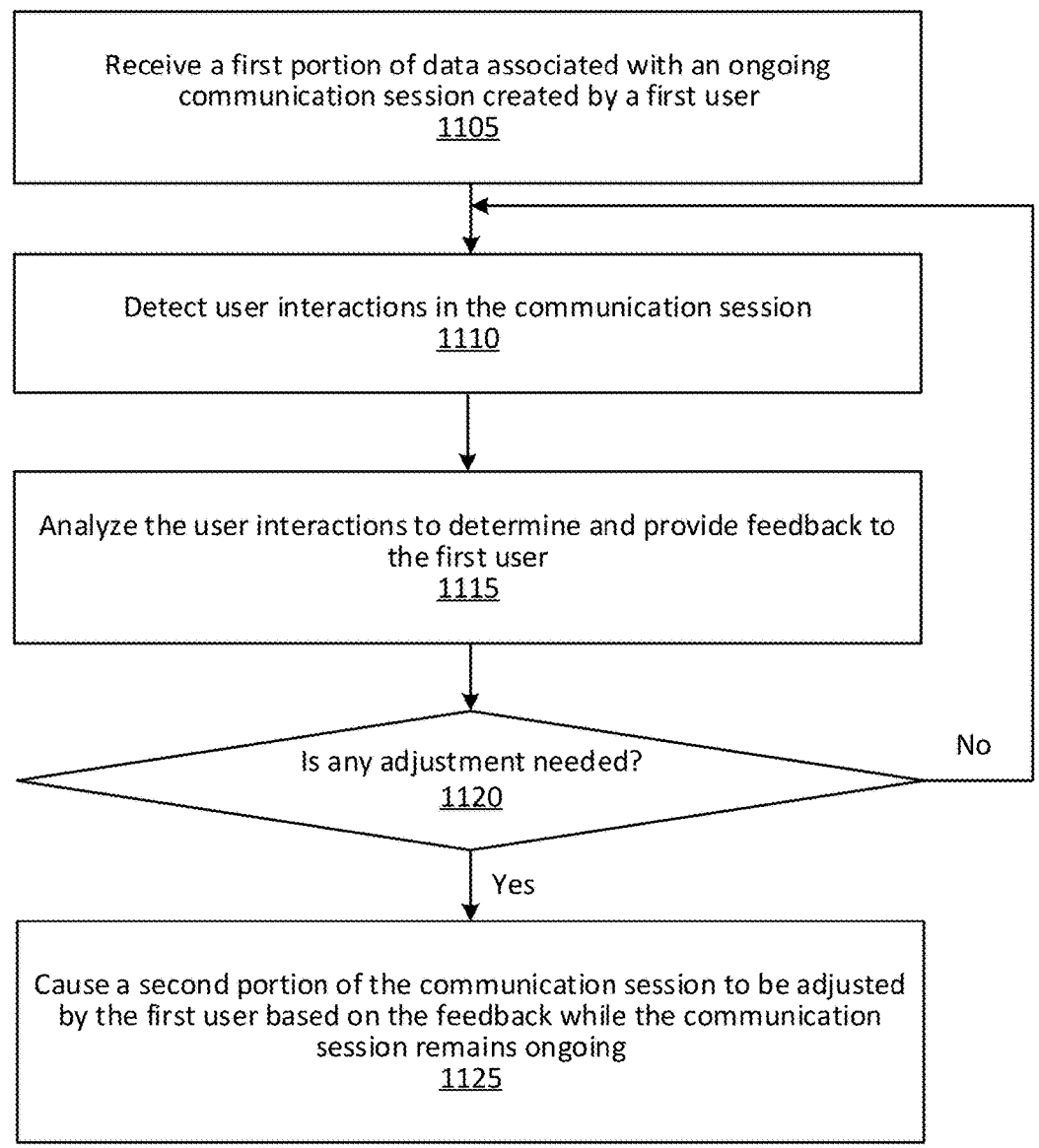
FIG. 11 illustrates a flowchart of generating and adjusting collaborative content of communication sessions, according to some embodiments.

FIG. 11 illustrates a flowchart 1100 of generating and adjusting collaborative content of communication sessions, according to some embodiments. In some embodiments, content management application 122 of data server 120 as depicted in FIG. 1 in communication with other components of platform 100 to implement process 1100. At step 1105, content management application 122 receives a first portion of data associated with an ongoing communication session created by a first user. The communication session may be a live show, a webinar, an industry forum, an online chat through social networking service, a training session, or any other type of virtual meeting. At step 1110, content management application 122 detects user interactions in the communication session. The user interactions include at least audio reactions or emoji reactions from one or more second users or audience. The emoji reactions can be Animoji reactions, where an Animoji is an animated reacting emoji.

At step 1115, content management application 122 analyzes the user interactions to determine and provide feedback to the first user. For example, content management application 122 may analyze emoji reactions or Animoji reactions. In some embodiments, content management application 122 may perform sentiment analysis to identify an emoji sentiment from the emoji/Animoji reactions and present the trend to the first user in real time for adjusting the second portion of the communication session. In some embodiments, content management application 122 may determine one or more segments of the communication session that have a maximal/minimal number of audience engagement. In some embodiments, content management application 122 may determine whether an amount of negative sentiments from the one or more second users exceeds a threshold, and responsive to determining that amount of negative sentiments exceeds the threshold, cause the communication session to be adjusted.

At step 1120, content management application 122 allows the first user to determine whether any adjustment is needed based on the feedback. If there is no need to make any adjustment, process 1100 goes back to step 1110 to continue detecting user interactions. If, however, an adjustment is needed, then content management application 122 causes a second portion of the communication session to be adjusted by the first user based on the feedback while the communication session remains ongoing at step 1125. The second portion is a portion subsequent to the first portion. For example, if a topic of the first portion of the communication session receives low user engagement, content management application 122 may cause the first user to change to a different subject. In some embodiments, content management application 122 may recommend the first user to invite a specific user to co-host the communication session, to invite audience to interact in the communication session, recommend a new subject, etc.

Figure 12:
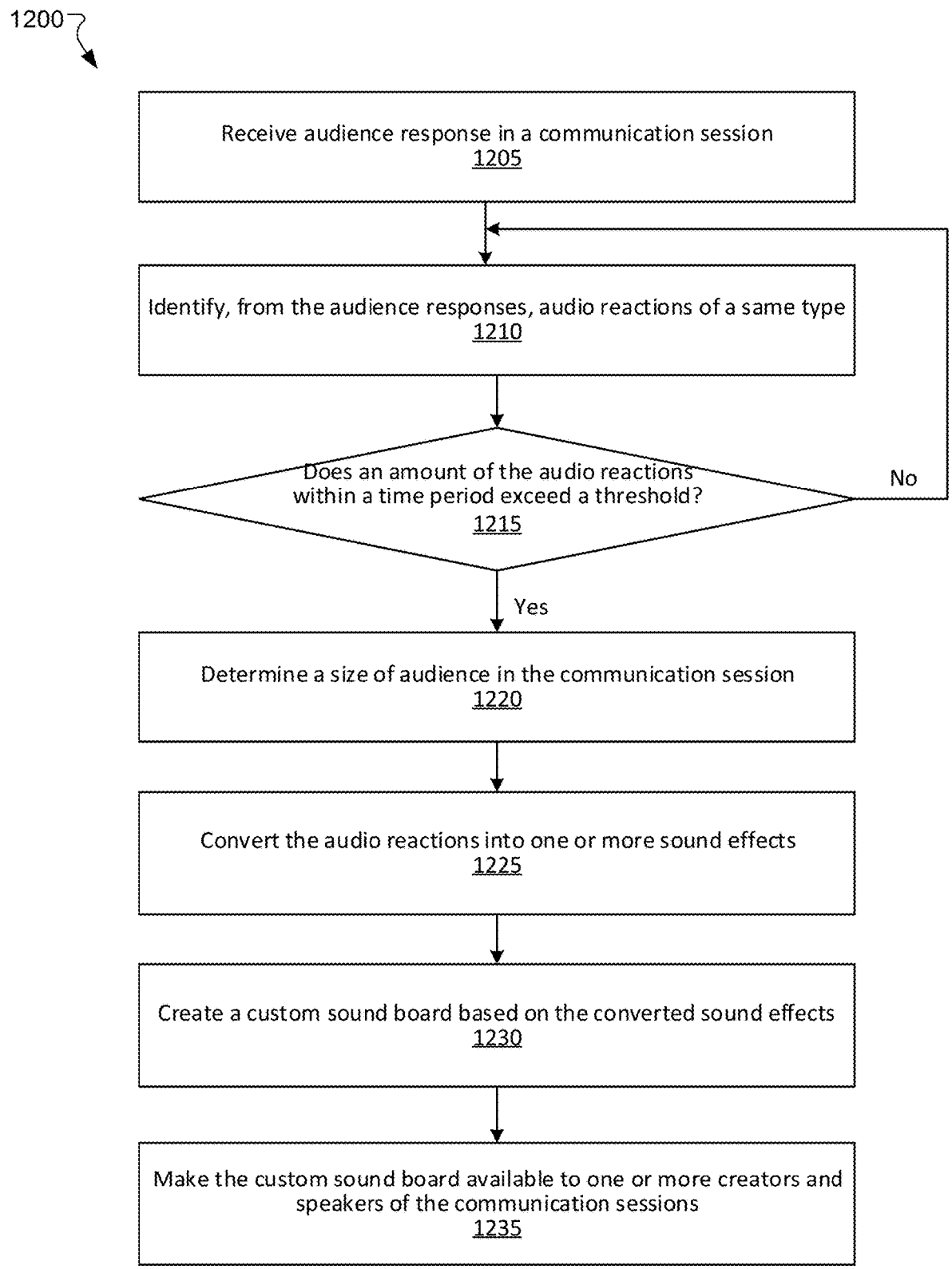
FIG. 12 illustrates a flowchart of analyzing audio reactions in a communication session, according to some embodiments.

FIG. 12 illustrates a flowchart 1200 of analyzing audio reactions in a communication session, according to some embodiments. In some embodiments, content management application 122 of data server 120 as depicted in FIG. 1 in communication with other components of platform 100 to implement process 1200. At step 1205, content management application 122 receives audience response in a communication session. The audience responses may be emoji/Animoji reactions, text messages, or audio reactions.

At step 1210, content management application 122 identifies, from the audience responses, audio reactions of a same type (e.g., claps, laughing, etc.). At step 1215, content management application 122 determines whether an amount of the audio reactions within a time period exceed a threshold. Based at least in part on the amount of the audio reactions, content management application 122 may determine whether and to which sound effect this type of sound reactions may be categorized.

If the amount of the audio reactions within the time period exceeds the threshold, at step 1220, content management application 122 determines a size of audience in the communication session. Otherwise, process 1100 returns back to step 1210 to further identify audio reactions. At step 1225, content management application 122 converts the audio reactions into one or more sound effects. In some embodiments, content management application 122 may identify a sound effect based on the size of audience and convert the audio reactions into the identified sound effect. For example, when a user in the audience claps, analytics engine 306 captures it and takes it as an individual clapping sound. When a number of users (e.g. above a first threshold) clap within a timeframe, e.g., five users clapped within one minute, content management application 122 shifts the individual clapping sound to a round of applause. Moreover, content management application 122 recognizes and customizes the audio reactions based on the size of audience. Therefore, content management application 122 may determine two different sound effects when six people clapped among 6000 audience and when five people clapped among 30 audience.

In some embodiments, content management application 122 may also modify the first threshold for categorizing sound reactions according to the size of audience. In some embodiments, content management application 122 may also customize sound reactions based on other criteria such as a participation rate, a location, indoor/outdoor, etc.

At step 1230, content management application 122 creates a custom sound board based on the converted sound effects. At step 1235, content management application 122 makes the custom sound board available to the first user. In some embodiments, content management application 122 may allow producers and creators (e.g., the first user) to use the custom sound board during their communication sessions (e.g., shows) and when they react to the content. In other embodiments, content management application 122 may also allow audience (e.g., second users) and creators to record their own sound effects tracks and create their own custom sound board.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described with the figures above. Modules may constitute either software modules (e.g., code embodied on a machine-readable medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processors) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" is employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for the system described above. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating, distributing, and adjusting collaborative content of one or more communications sessions, the method comprising:
   start and host a communication session comprising an ongoing communication session, the ongoing communication session having at least a first portion and a second portion and including at least one first user, a virtual audience, and one or more of a virtual stage, a virtual studio, a metastudio, and a virtual auditorium;
   inviting one or more second users to join the communication session;
   receiving determinations from one or more of the second users to join and adding the confirmed second users to the communication session;
   distributing to the one or more second users content created or contributed to by the at least one first user during the first portion of the ongoing communication session;
   detecting user reactions or interactions from one or more of the second users in response to the content of the first portion of the ongoing communication session;
   analyzing the user interactions to determine feedback associated with one or more of the second users;
   providing the feedback to the first user;
   identifying one or more third users from the one or more second users based on the feedback; and
   initiating the second portion and adjusting the content created or contributed to by the at least one first user during the second portion of the ongoing communication session at least by adding one or more of the third users to the content of the second portion of the ongoing communication session.

2. The method of claim 1, wherein the user interactions comprise audio reactions, and the method comprises:
   identifying the audio reactions of a same type;
   determining an amount of the identified audio reactions within a time period; and
   responsive to the determined amount exceeding a threshold, determining a size of audience in the communication session;
   identifying a sound effect based on the size of audience; and converting the audio reactions into the identified sound effects.

3. The method of claim 2, further comprising:
   creating a custom sound board based on the converted sound effects; and making the custom sound board available to the first user.

4. The method of claim 1, wherein the user interactions comprise emoji reactions, and the method comprises:
   performing sentiment analysis to identify an emoji sentiment trend from the emoji reactions; and
   presenting the trend to the first user in real time for adjusting the second portion of the communication session.

5. The method of claim 1, wherein analyzing the user interactions comprises:
   determining one or more first segments of the communication session that have a maximal number of audience engagement; and
   determining one or more second segments of the communication session that have a minimal number of audience engagement.

6. The method of claim 1, wherein analyzing the user interactions comprises:
   determining whether an amount of negative sentiments from the one or more second users exceeds a threshold;
   responsive to determining that amount of negative sentiments exceeds the threshold, causing the communication session to be adjusted.

7. The method of claim 1, further comprising:
   generating at least one of content insights, speaker insights, or replay insights; and
   causing content of the communication session to be edited based on the generated insights.

8. The method of claim 1, further comprising: distributing the communication session by at least one of:
   broadcasting the communication session live on one or more platforms, or recording the communication session and streaming the recorded communication session on demand.

9. The method of claim 8, further comprising:
   collecting data of post-distribution user interactions with the communication session from one or more third users after the communication session is distributed;
   analyzing the post-distribution user interactions from the one or more third users;
   generating one or more recommendations based on analyzing the user interactions from the one or more second users and analyzing the post-distribution user interactions from the one or more third users; and
   providing the one or more recommendations to the first user.

10. The method of claim 1, further comprising:
    syndicating the communication session to a plurality of external platforms; and
    enabling users associated with the external platforms to create content of the communication session with real-time feedback from audience and to interact in the communication session.

11. A system for generating, distributing, and adjusting collaborative content of one or more communications sessions, the system comprising:
    a processor; and
    a memory in communication with the processor and comprising instructions which, when executed by the processor, program the processor to:
       start and host a communication session, comprising an ongoing communication session having at least a first portion and a second portion and including at least one first user, a virtual audience, and one or more of a virtual stage, a virtual studio, a metastudio, and a virtual auditorium;
       invite one or more second users to join the communication session;
       receive determinations from one or more of the second users whether to join and adding the confirmed second users to the communication session;

distribute to the one or more second users content created or contributed to by the at least one first user during the first portion of the ongoing communication session;

detect user activities or interactions from one or more of the second users in response to the content of the first portion of the ongoing communication session;

analyze the user actions or interactions to determine feedback associated with one or more of the second users;

provide the feedback to the first user;

identify one or more third users from the one or more second users based on the feedback; and initiate the second portion and adjust the content created or contributed to by the at least one first user during the second portion of the ongoing communication session at least by adding one or more of the third users to the content of the second portion of the ongoing communication session.

12. The system of claim 11, wherein the user interactions comprise audio reactions, the instructions further program the processor to:

identify the audio reactions of a same type;

determine an amount of the identified audio reactions within a time period; and responsive to the determined amount exceeding a threshold, determine a size of audience in the communication session;

identify a sound effect based on the size of audience; and convert the audio reactions into the identified sound effects.

13. The system of claim 12, wherein the instructions further program the processor to:

create a custom sound board based on the converted sound effects; and make the custom sound board available to the first user.

14. The system of claim 11, wherein the user interactions comprises emoji reactions, the instructions further program the processor to:

perform sentiment analysis to identify an emoji sentiment trend from the emoji reactions; and present the trend to the first user in real time for adjusting the second portion of the communication session.

15. The system of claim 11, wherein to analyze the user interactions, the instructions further program the processor to:

determine whether an amount of negative sentiments from the one or more second users exceeds a threshold;

responsive to determining that amount of negative sentiments exceeds the threshold, cause the communication session to be adjusted.

16. The system of claim 11, wherein the instructions further program the processor to:

distribute the communication session by at least one of: broadcasting the communication session live on one or more platforms, or recording the communication session and streaming the recorded communication session on demand.

17. The system of claim 16, wherein the instructions further program the processor to:

collect data of post-distribution user interactions with the communication session from one or more third users after the communication session is distributed;

analyze the post-distribution user interactions from the one or more third users;

generate one or more recommendations based on analyzing the user interactions from the one or more second users and analyzing the post-distribution user interactions from the one or more third users; and provide the one or more recommendations to the first user.

18. The system of claim 11, wherein the instructions further program the processor to:

syndicate the communication session to a plurality of external platforms; and enable users associated with the external platforms to create content of the communication session with real-time feedback from audience and to interact in the communication session.

19. A computer program product for generating, distributing, and adjusting collaborative content of one or more communications sessions, the computer program product comprising a non-transitory computer-readable medium having computer readable program code stored thereon, the computer readable program code configured to:

start and host a communication session, comprising an ongoing communication session having at least a first portion and a second portion and including at least a first user, a virtual audience, and one or more of a virtual stage, a virtual studio, a metastudio, and a virtual auditorium;

invite one or more second users to join the communication session;

receive determinations from one or more of the second users whether to join and adding the confirmed second users to the communication session;

distribute to the one or more second users content created or contributed to by the at least one first user during the first portion of the ongoing communication session;

detect user activities or interactions from one or more of the second users in response to the content of the first portion of the ongoing communication session;

analyze the user reactions or interactions to determine feedback associated with one or more of the second users;

provide the feedback to the first user;

identify one or more third users from the one or more second users based on the feedback; and adjust the content created or contributed to by the at least one first user during the second portion of the ongoing communication session at least by adding one or more of the third users to the content of the second portion of the ongoing communication session.

20. The computer program product of claim 19, wherein the user interactions comprise audio reactions, and the computer readable program code is configured to:

identify the audio reactions of a same type;

determine an amount of the identified audio reactions within a time period; and responsive to the determined amount exceeding a threshold, determine a size of audience in the communication session;

identify a sound effect based on the size of audience; and convert the audio reactions into the identified sound effects.

* * * * *